(12) United States Patent
Rydbeck et al.

(10) Patent No.: US 9,123,034 B2
(45) Date of Patent: Sep. 1, 2015

(54) METHODS AND SYSTEMS FOR ELECTRONIC PAYMENT FOR PARKING USING AUTONOMOUS POSITION SENSING

(71) Applicants: Nils Rydbeck, Summerland Key, FL (US); Santanu Dutta, Vienna, VA (US)

(72) Inventors: Nils Rydbeck, Summerland Key, FL (US); Santanu Dutta, Vienna, VA (US)

(73) Assignee: TRANSPARENT WIRELESS SYSTEMS, LLC, Vienna, VA (US)

( * ) Notice: Subject to any disclaimer, the term of this patent is extended or adjusted under 35 U.S.C. 154(b) by 19 days.

(21) Appl. No.: 13/862,619

(22) Filed: Apr. 15, 2013

(65) Prior Publication Data

US 2013/0282448 A1 Oct. 24, 2013

Related U.S. Application Data

(60) Provisional application No. 61/687,333, filed on Apr. 23, 2012.

(51) Int. Cl.
| | |
|---|---|
| *G07B 15/00* | (2011.01) |
| *G07B 15/02* | (2011.01) |
| *G06Q 20/14* | (2012.01) |
| *G08G 1/00* | (2006.01) |
| *G07F 17/24* | (2006.01) |
| *G06Q 20/32* | (2012.01) |

(52) U.S. Cl.
CPC .......... *G06Q 20/145* (2013.01); *G06Q 20/3224* (2013.01); *G07B 15/02* (2013.01); *G07F 17/246* (2013.01); *G08G 1/00* (2013.01)

(58) Field of Classification Search
CPC ...... G07B 15/063; G07B 15/02; G07B 15/06; G06Q 20/145; G06Q 20/3224; G08G 1/00; G07F 17/246

USPC .......................................................... 705/13
See application file for complete search history.

(56) References Cited

U.S. PATENT DOCUMENTS

| | | | | |
|---|---|---|---|---|
| 5,928,309 | A | * | 7/1999 | Korver et al. ................. 701/470 |
| 6,081,206 | A | * | 6/2000 | Kielland ....................... 340/937 |
| 6,081,230 | A | * | 6/2000 | Hoshino et al. .......... 342/357.32 |
| 7,188,070 | B2 | | 3/2007 | Dar et al. |
| 7,215,255 | B2 | | 5/2007 | Grush |

(Continued)

OTHER PUBLICATIONS http://www.verrus.com/default.asp?ctState=prHow, Wireless Parking Payment, Apr. 10, 2013, webpage, 1pg.

(Continued)

*Primary Examiner* — Allen J Jung
(74) *Attorney, Agent, or Firm* — The Marbury Law Group PLLC

(57) ABSTRACT

A method/system of wireless payment of parking fees for a vehicle, applicable to both open street and closed garage parking, wherein the user and checker experiences are enhanced relative to the prior art by a number of means, including: autonomous sensing of the user's/vehicle's location and allowing the user to correct the indicated location if required; enabling a handset to automatically sense the ID of the vehicle in which it is located; enabling rapid and facile enforcement by providing the Checker with information about the location, parking session status and other attributes of parked vehicles and displaying the information on a portable terminal in a manner facilitating rapid validation; and further facilitating the identification of vehicles with expired sessions by a method/system of RF interrogation involving RF tags located in/on the vehicles and the checking terminal querying the RF tags.

10 Claims, 28 Drawing Sheets

Street Parking Screens: Start Parking

(56) References Cited

U.S. PATENT DOCUMENTS

| | | | |
|---|---|---|---|
| 7,908,149 B2 | 3/2011 | Dar et al. | |
| 8,131,596 B2 | 3/2012 | McQuilken | |
| 8,140,265 B2 | 3/2012 | Grush | |
| 8,175,886 B2 | 5/2012 | Odinak | |
| 2003/0146852 A1* | 8/2003 | O'Dell | 340/932.2 |
| 2005/0286421 A1* | 12/2005 | Janacek | 370/231 |
| 2007/0016362 A1* | 1/2007 | Nelson | 701/200 |
| 2008/0117100 A1* | 5/2008 | Wang et al. | 342/357.02 |
| 2009/0292597 A1* | 11/2009 | Schwartz et al. | 705/13 |
| 2011/0153367 A1* | 6/2011 | Amigo et al. | 705/4 |
| 2012/0130777 A1* | 5/2012 | Kaufman | 705/13 |
| 2012/0308077 A1* | 12/2012 | Tseng | 382/103 |
| 2014/0236686 A1 | 8/2014 | Grush et al. | |

OTHER PUBLICATIONS http://us.parkmobile.com/members/, Mobile Payment Parking Solutions, Apr. 11, 2013, webpage, 1pg.
http://sfpark.org/, Apr. 11, 2013, 3pgs.
http://www.indiegogo.com/projects/sticknfind-bluetooth-powered-ultra-small-location-stickers, Ultra small sticker with Blue Tooth low energy, Apr. 11, 2013, 18pgs.
International Standard, ISO/IEC 18000-6, "Information Technology—Radio Frequency Identification for Item Management," First Edition, Aug. 15, 2004, copyright ISO/IEC 2004, 144pgs.
Letter from Deeth Williams Wall, LLP; dated Jan. 5, 2015.

* cited by examiner

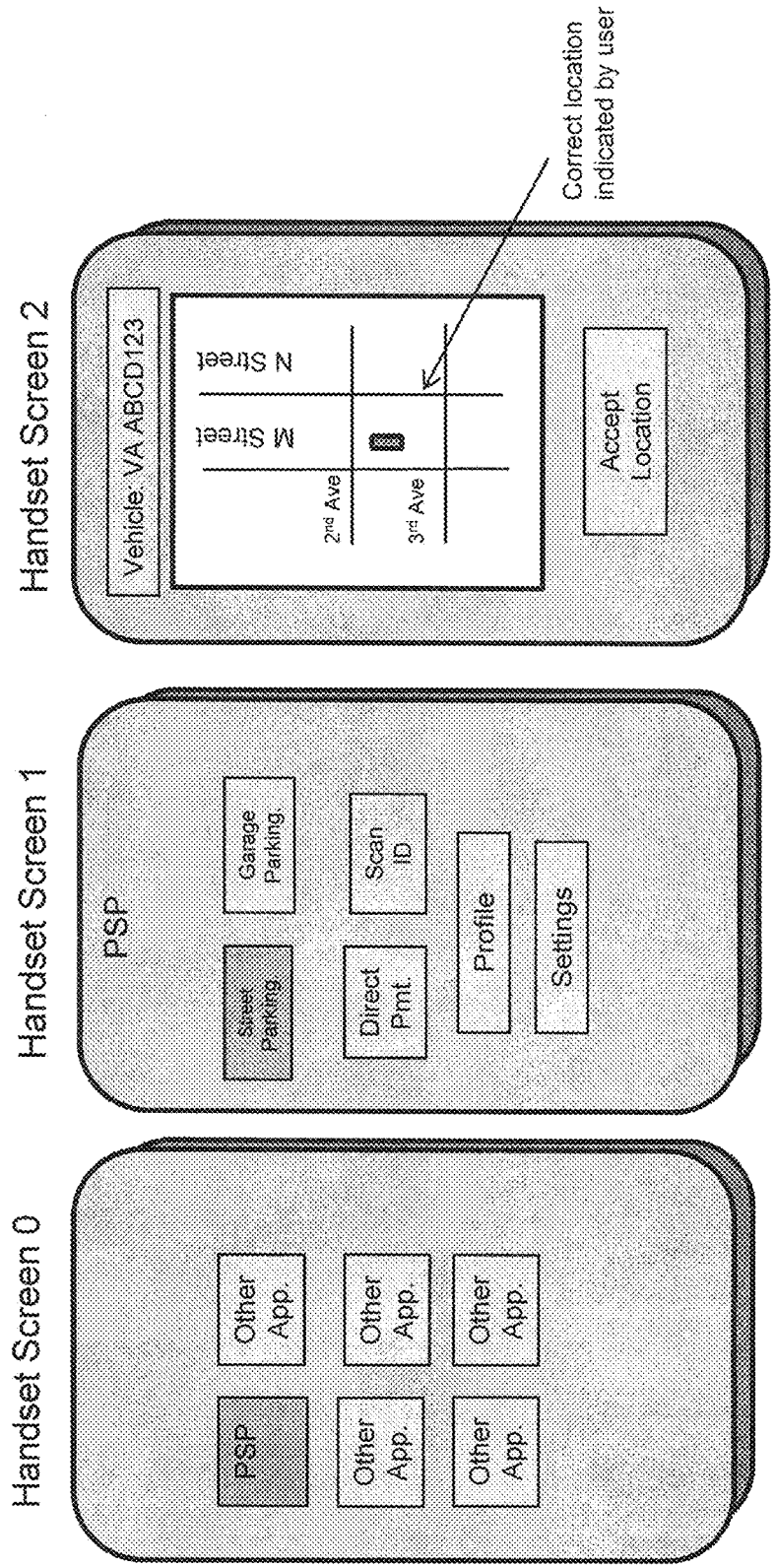

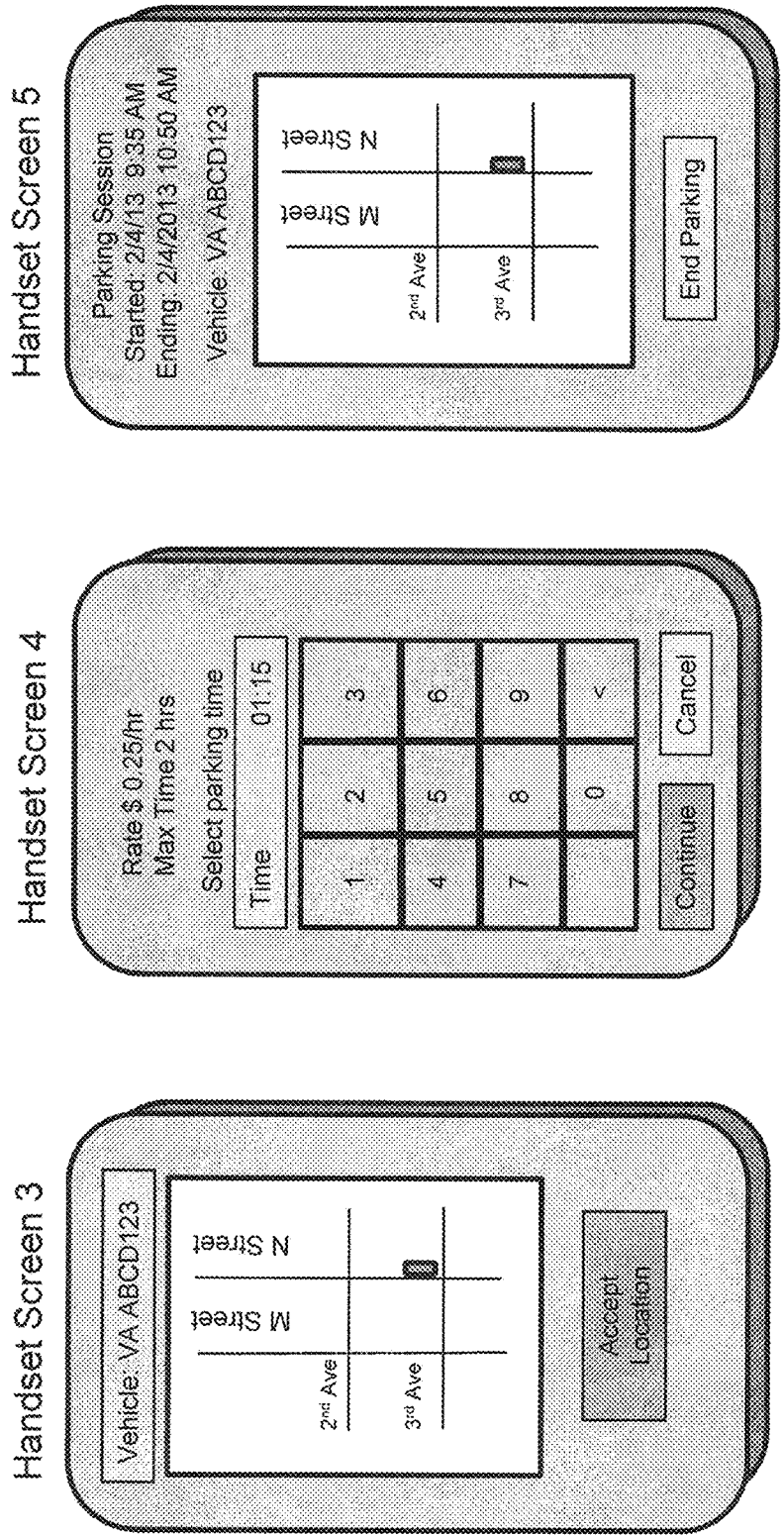

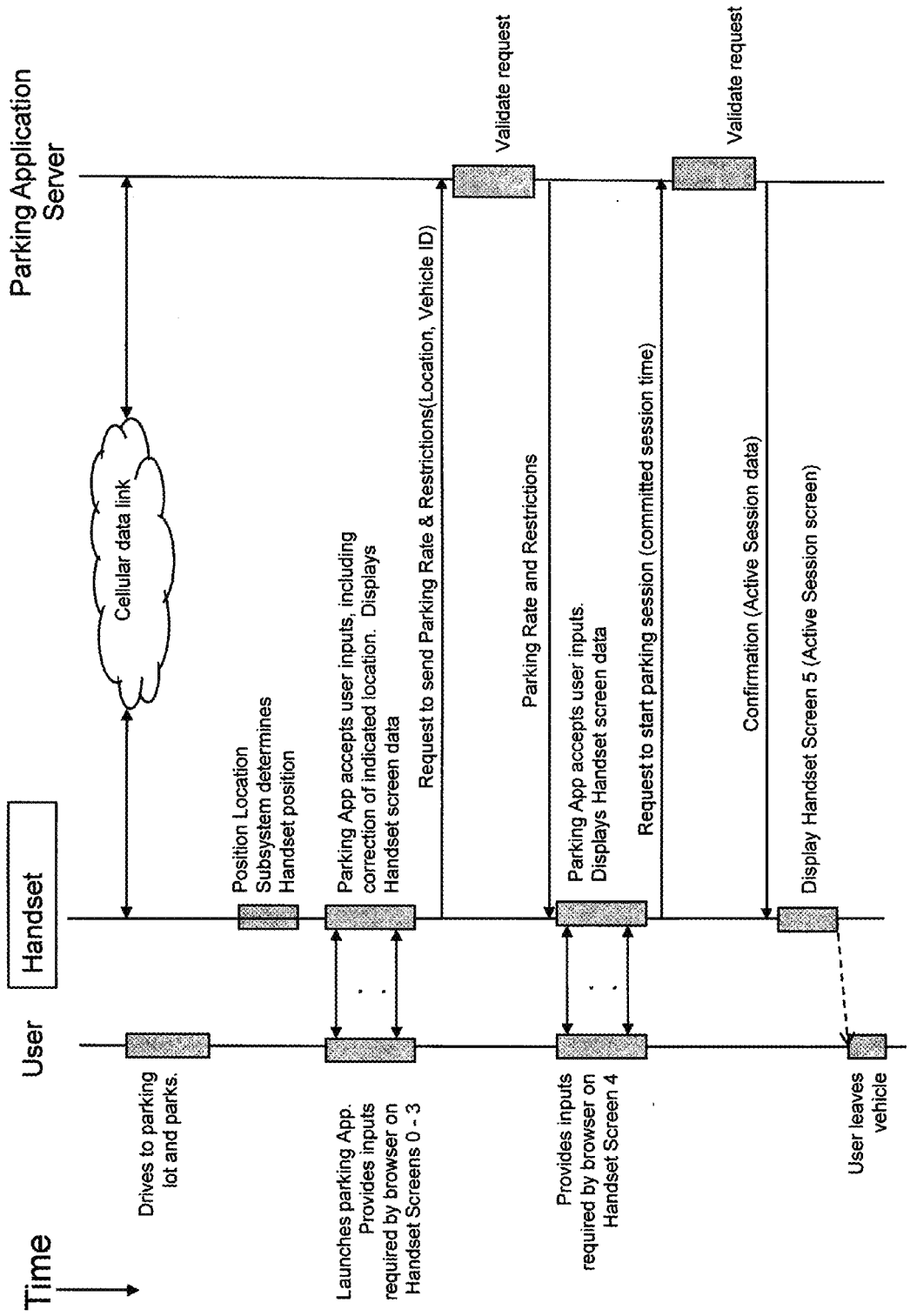

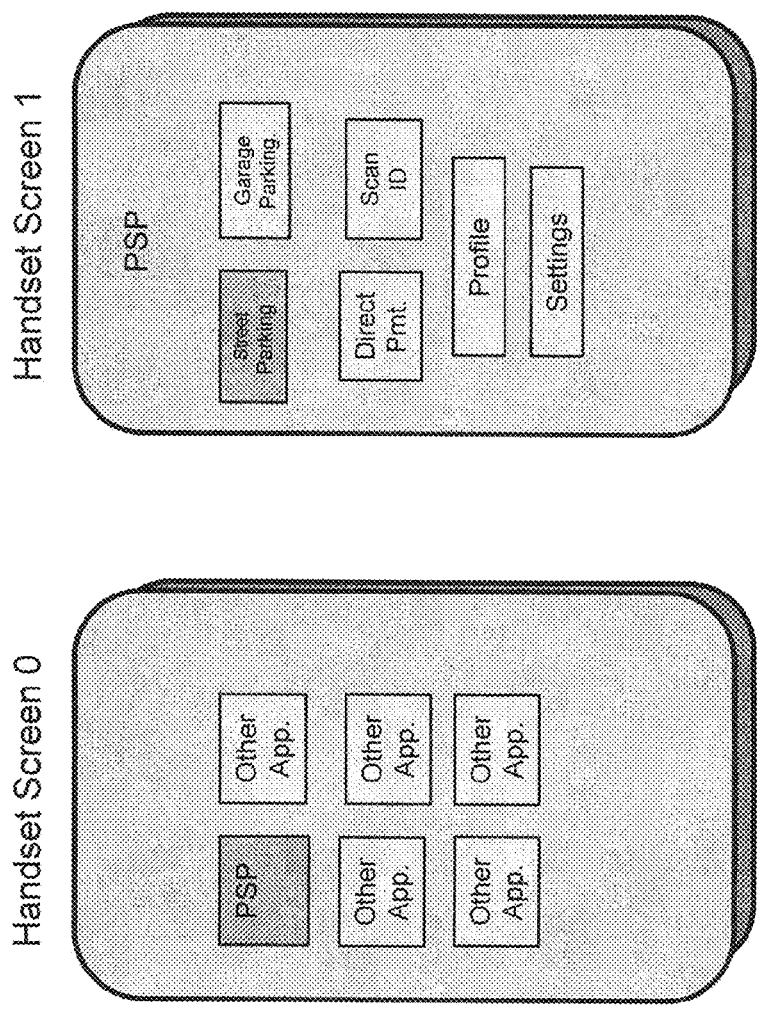

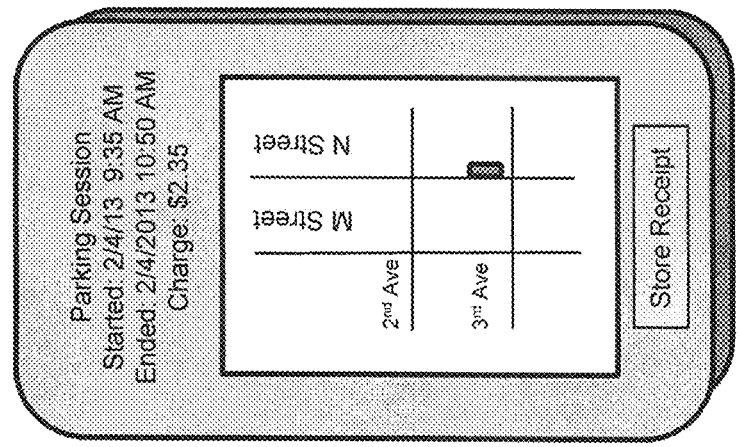

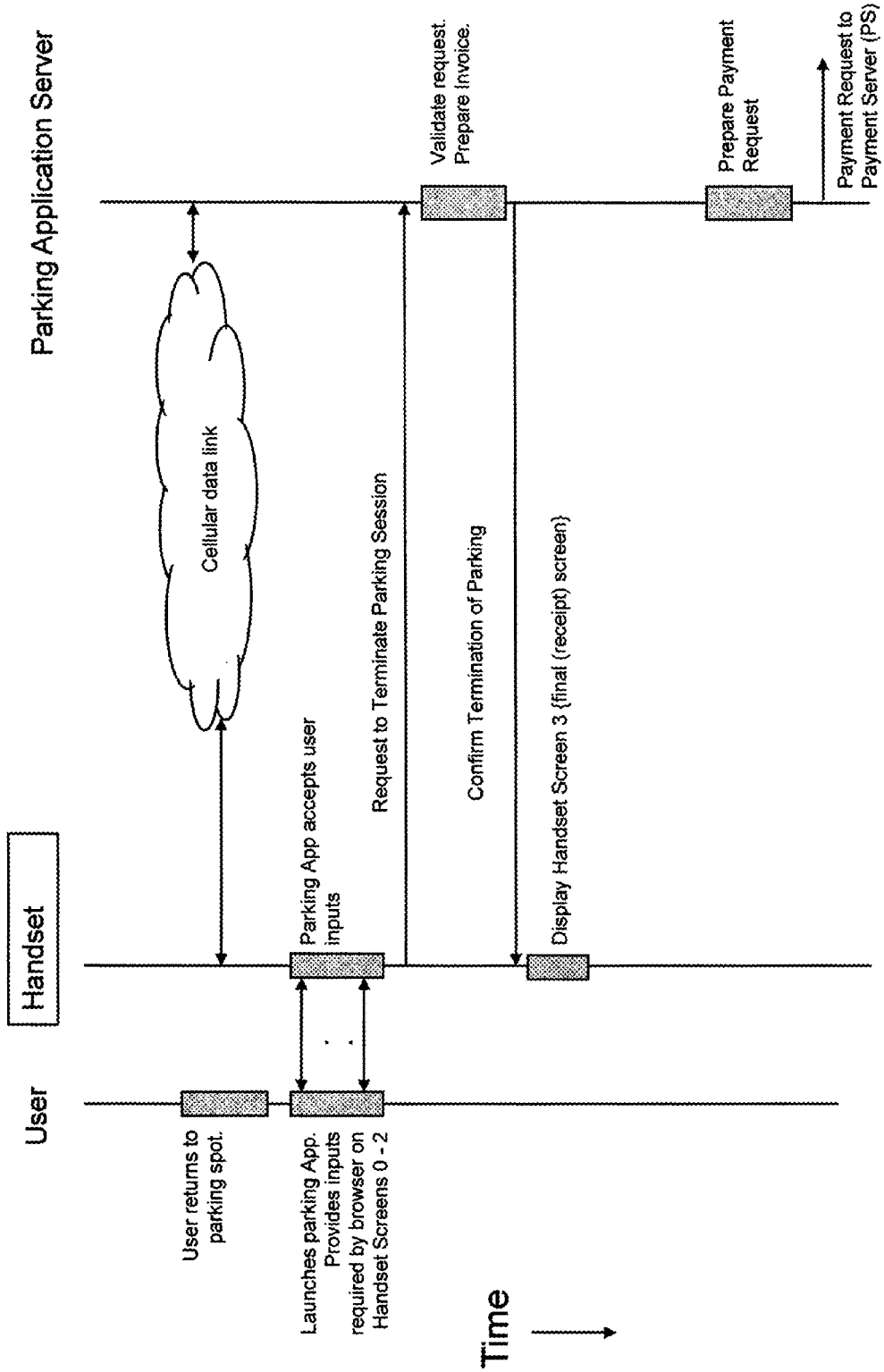

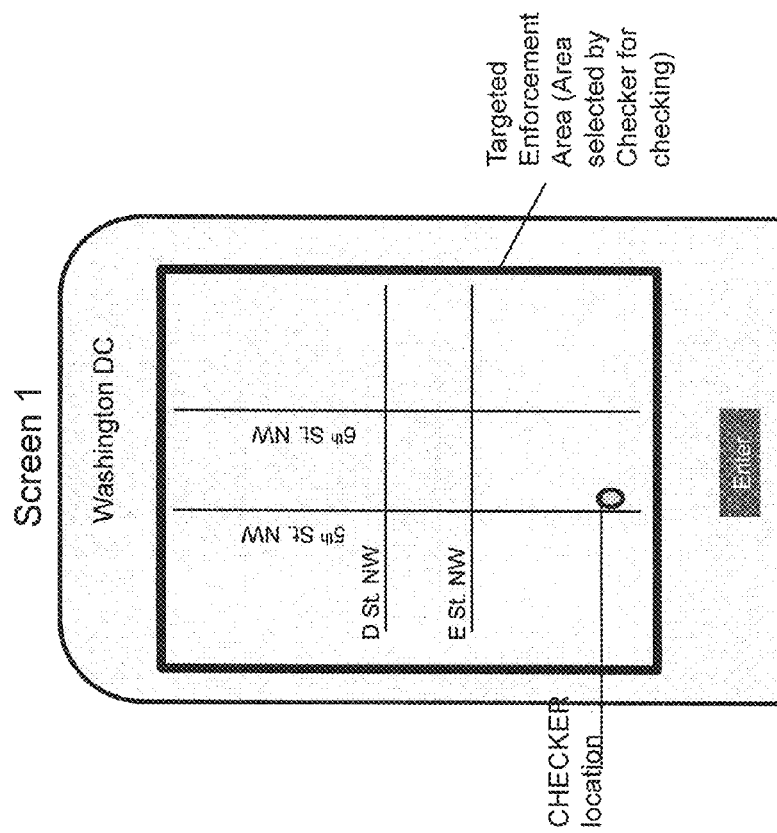

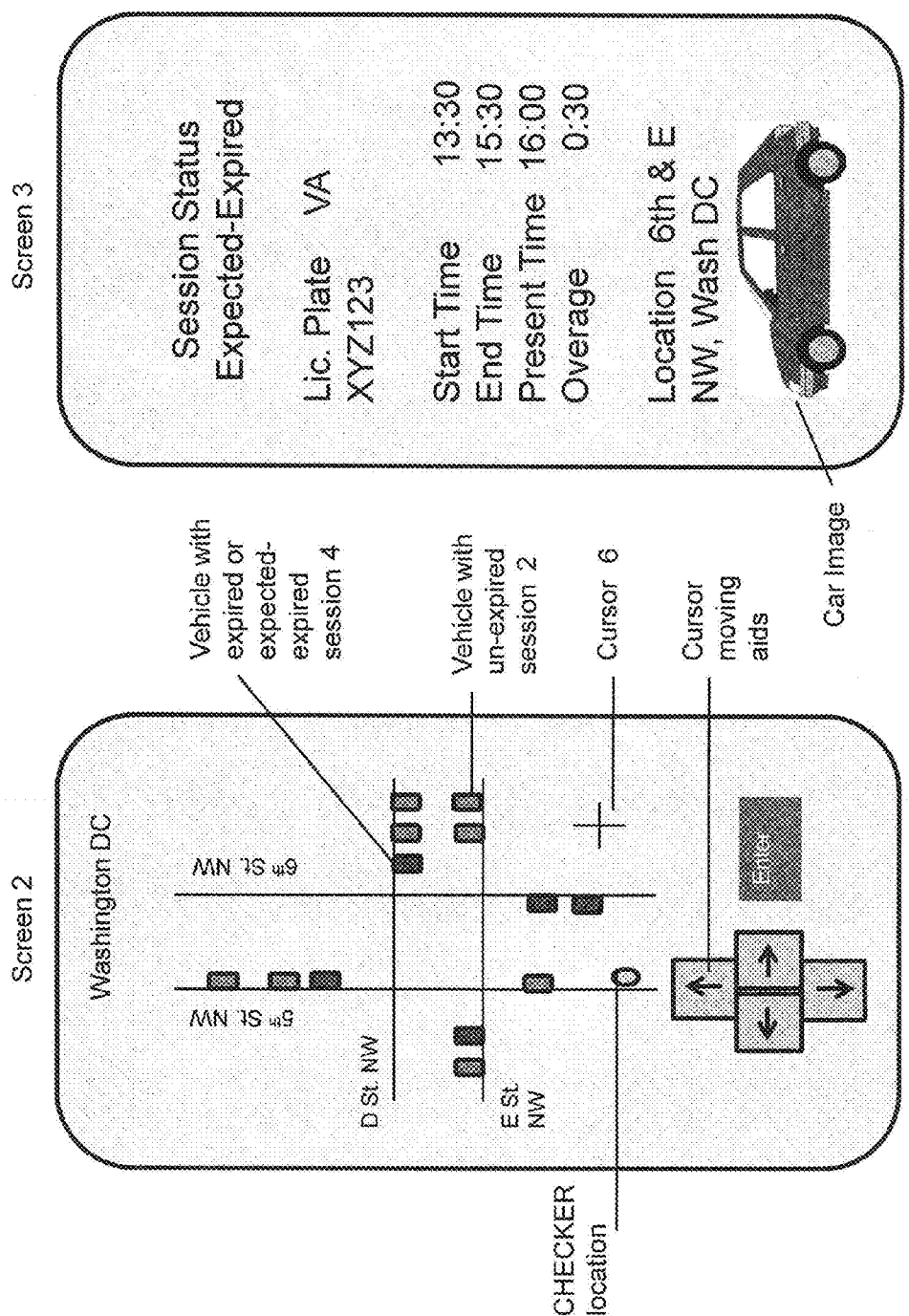

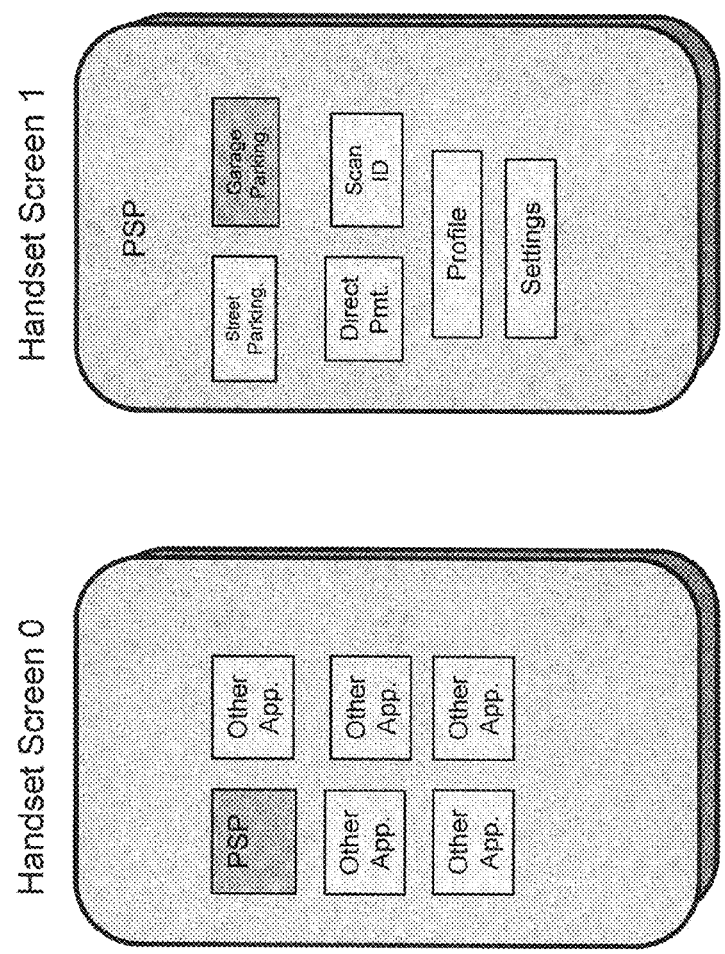

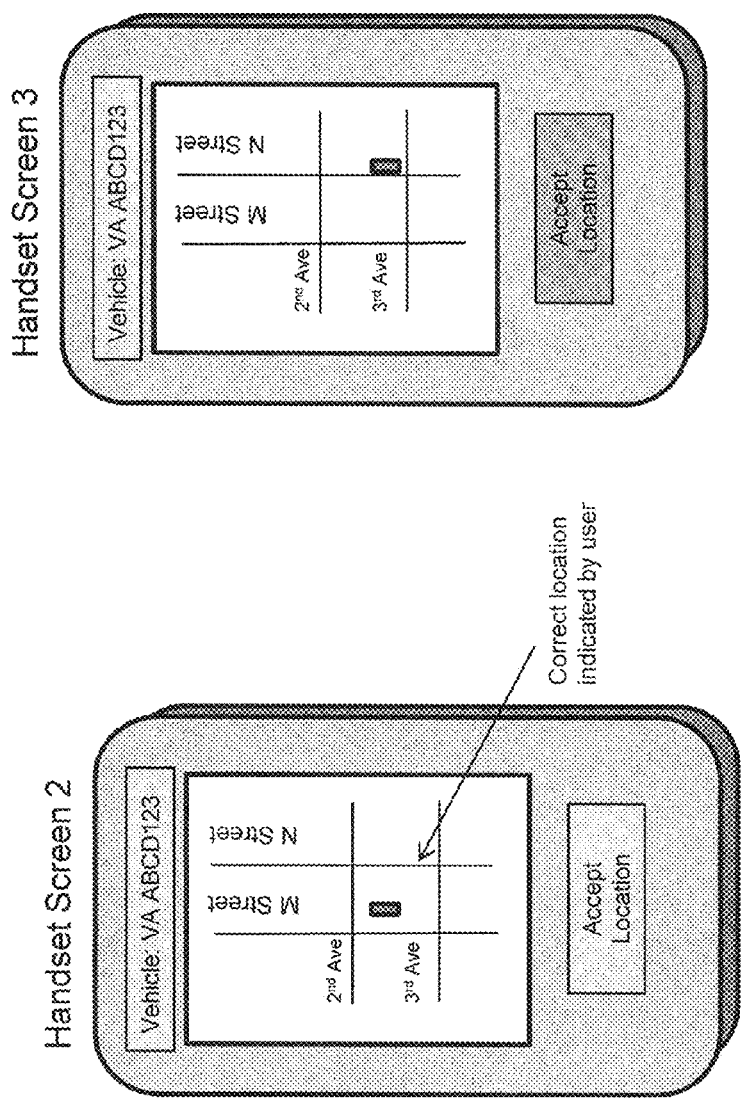

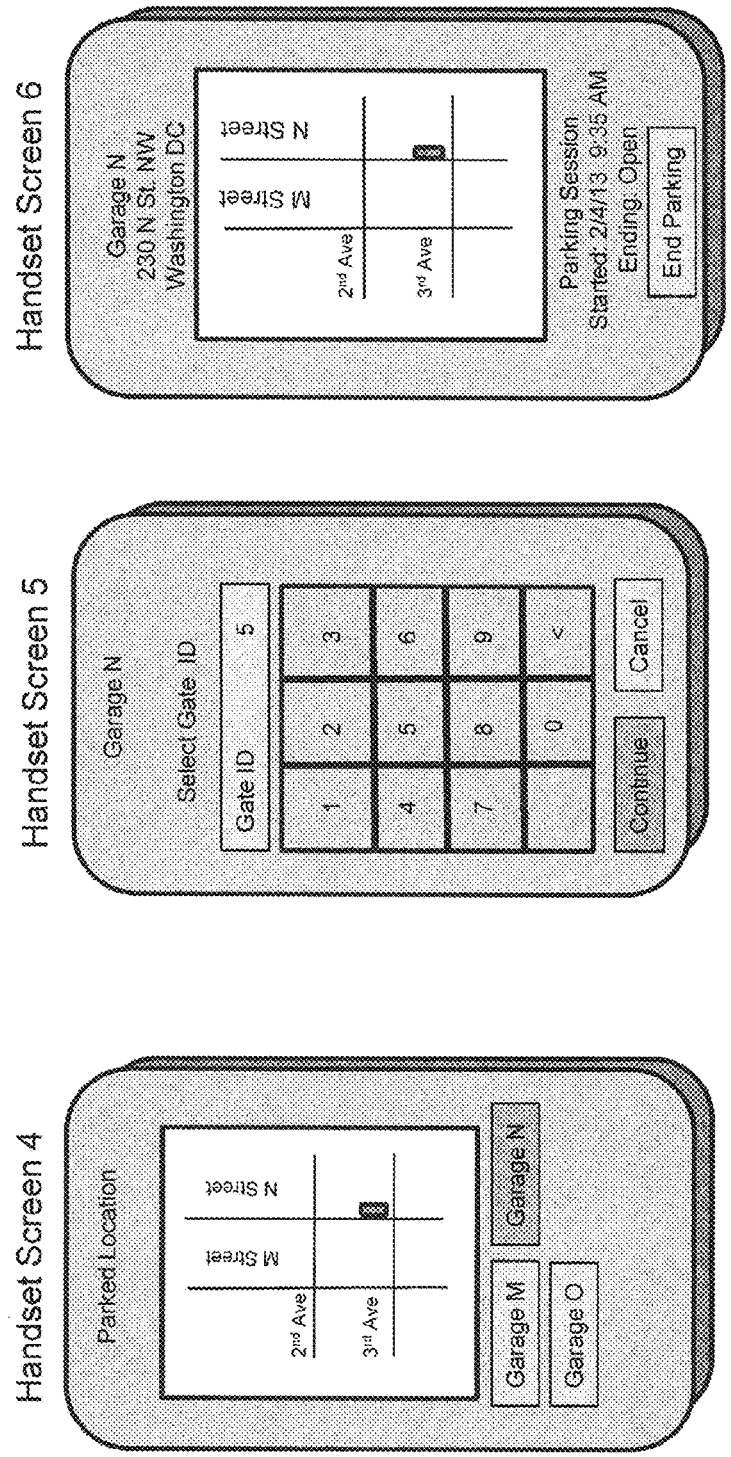

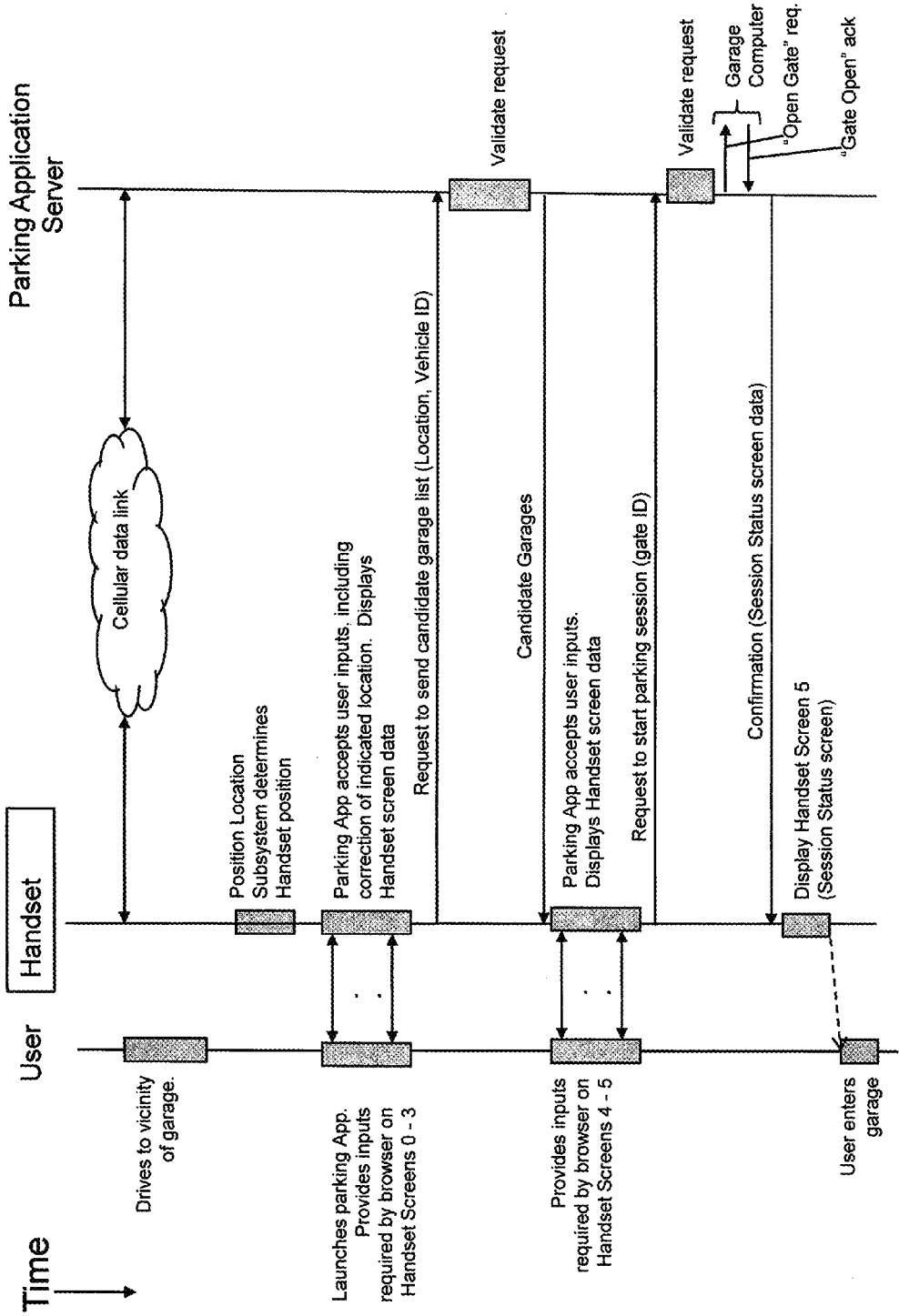

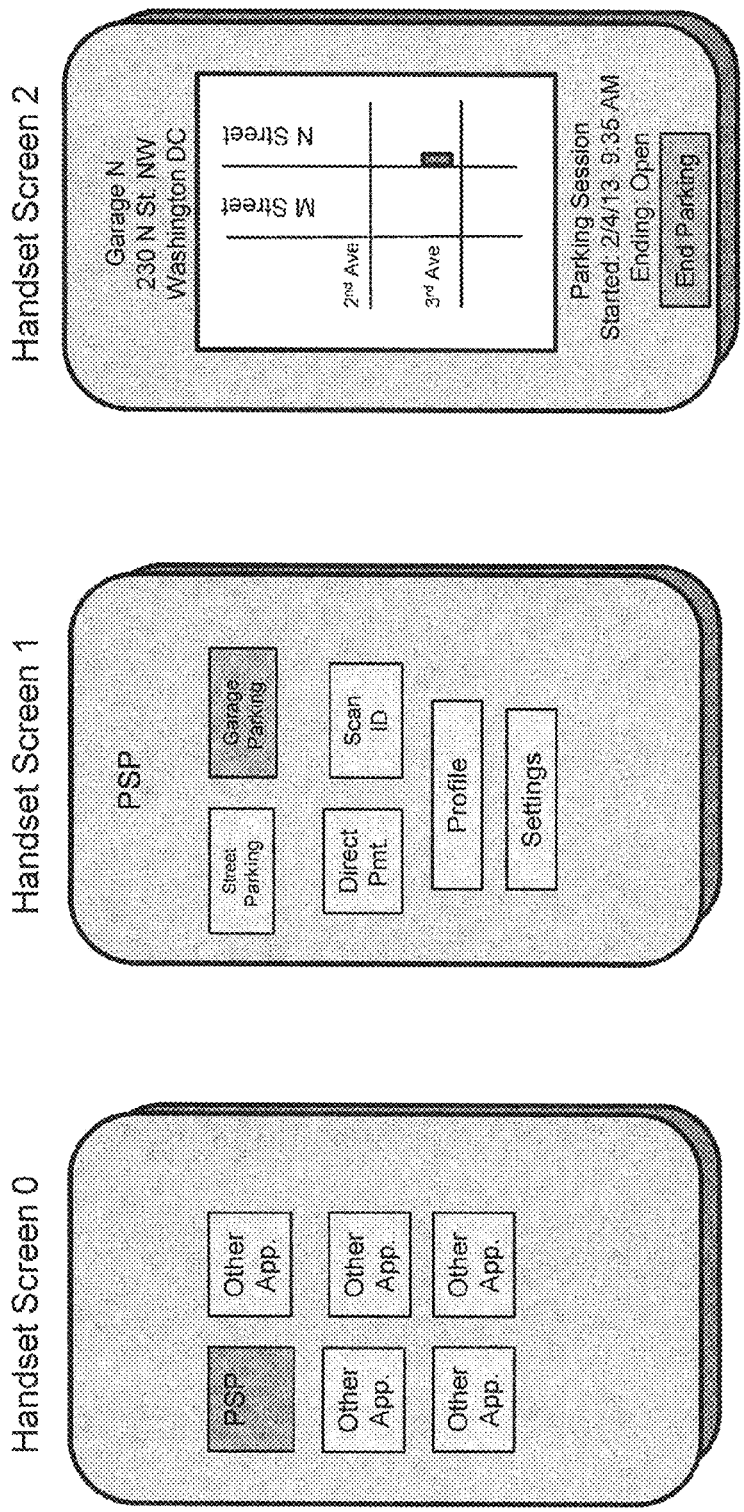

Closed Garage Parking Screens: End Parking

Closed Garage Parking Screens: End Parking

Direct Payment

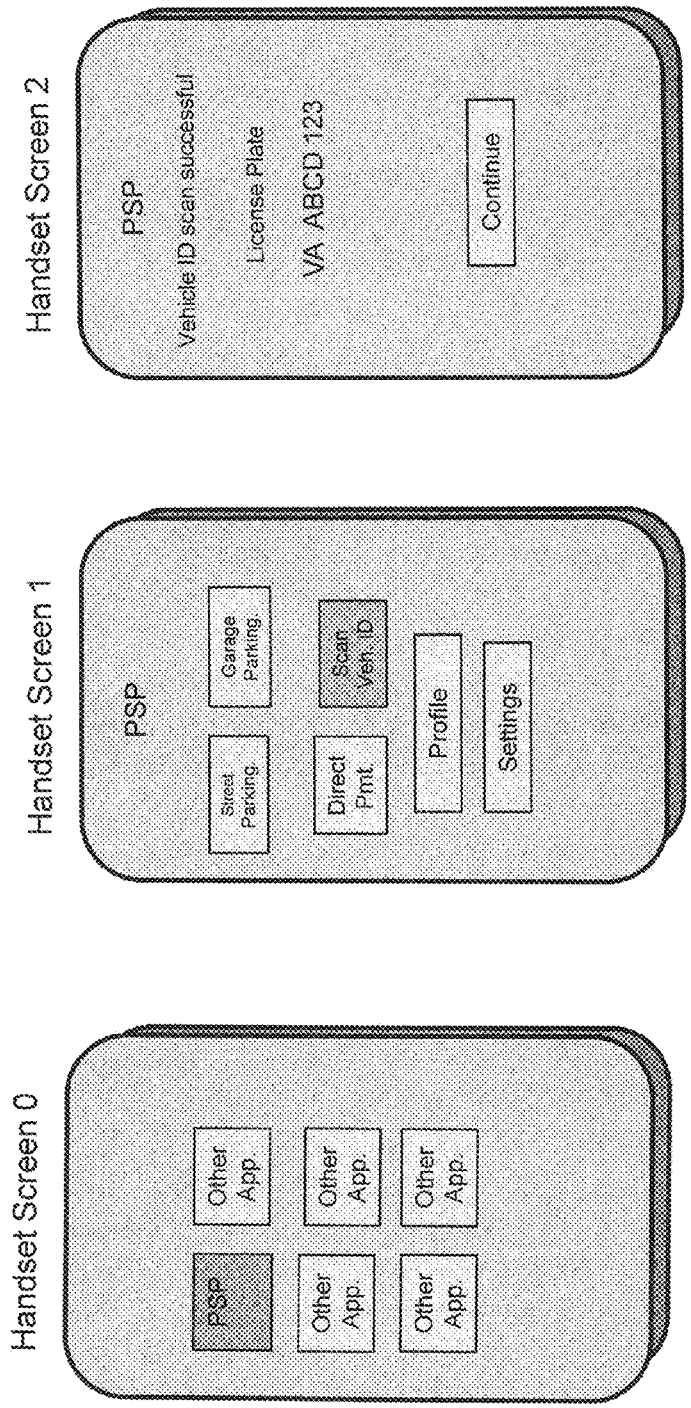

Steps in Vehicle Recognition: Optical Scanning

METHODS AND SYSTEMS FOR ELECTRONIC PAYMENT FOR PARKING USING AUTONOMOUS POSITION SENSING

RELATED APPLICATIONS

This application claims priority from U.S. Provisional Application Ser. No. 61/687,333, filed Apr. 23, 2012 and titled, "Methods and Systems for Electronic Parking Using an In-Vehicle Smart Electronic TOKEN," hereby incorporated by reference in its entirety.

FIELD OF INVENTION

The invention relates to the fields of wireless mobile commerce, cashless parking and wireless payment for parking.

BACKGROUND

Any parking system consists of the following main features: (a) authorization—a method of seeking permission to park by the user and by the Parking Authority to grant authorization; (b) payment—a method of collecting payment from the user; (c) validation—a method of checking whether the authorized time has run out or the vehicle was never authorized; (d) enforcement—a method used by the parking authority for penalizing vehicles that have not paid or have overstayed their authorized time. The term, "targeted enforcement" refers to enforcement that is selectively targeted at a subset of the general population of vehicles.

These requirements are fundamental—they are present in legacy systems and continue to be requirements for new systems. Modern systems and methods are using wireless technologies to improve consumer experience and reduce the cost of providing service while still meeting the above requirements. Some examples of prior art methods are described below.

Open, Roadside, Coin Operated Parking Meters

A mechanical device, known as a parking meter, is permanently mounted on the sidewalk and associated with a particular marked parking space on the street. The user (person wishing to occupy a parking space) inserts coins of denominations usually specified on the parking meter into a slot in the meter. The total value of the coins inserted corresponds to an authorized parking duration, which is displayed by the meter. As time elapses, a clockwork mechanism in the meter reduces the authorized time until the latter is completely exhausted. Thereupon, a prominent sign (often a red flag) that the authorized time has expired is displayed. If a vehicle is parked in a spot where the meter has run out, it is liable to be penalized by the parking authority, often by being given a paper ticket. Human collectors periodically collect the coins deposited in the meters.

Gated Parking Lots (Closed Garages)

In such systems, a variety of means are used to determine when a vehicle entered and exited the lot. These may include the user getting a paper ticket with the entry time numerically stamped or bar-coded on to the ticket. The parking fee may be a flat fee or dependent on the time a vehicle spends in the parking lot. The method of payment may be by cash or credit card and may involve a human operating the exit gate and manually validating the paper ticket. Alternatively, the user may pay by credit card at a payment kiosk, which stamps an "authorization to exit" on the parking ticket, which is valid for a time period that is sufficient to allow the user to exit. The user may exit by presenting the ticket at a gate operated by an automated ticket reader or a human operator.

There are also prior art, gated parking lots where the user is required to swipe a credit card or a special identification (ID) token issued by the garage at the point of entry (before entry is allowed). The garage is equipped with a computer that identifies the vehicle by the credit card or the identification token and keeps track of elapsed time until the vehicle exits the garage, at which point, the user swipes the credit card or ID token a second time. The second swiping causes the garage computer to calculate the vehicle's stay duration and accordingly charges the credit card or some other pre-arranged payment system.

Open-Access Parking Lots with Payment Kiosks

More recently, owing to the difficulty of maintenance and payment collection, coin operated parking meters are being replaced with multi-space payment kiosks. A kiosk may serve a large number of open-access (i.e. non-gated) numbered or un-numbered parking spaces. The user parks his vehicle in an available space, enters his space-number (if the parking spaces are numbered) on the operating console of the kiosk and requests to occupy the specified space for a specified time period. The kiosk issues a paper ticket, or token, containing the space-number and the authorized time, sometimes by specifying the time of day when the token expires. If the parking spaces are un-numbered, the ticket does not contain a space-number field. The user is required to display the ticket prominently so that parking authority agents may inspect vehicles for enforcement.

Payment by Wireless

In the past several years, a number of wireless payment systems have been introduced to replace the coin operated meter and the payment kiosks described in the previous sections. In most cases, a cellphone, or Handset, is involved and the systems are generally referred to as, "pay by cell." This has been facilitated by the fact that modern cellphones (Handsets) can engage in payment transactions with a remote server either via commonly available cellular data services or through automated voice activated systems. The Verrus system is an example of prior art use of wireless means for parking authorization and payment.

In the Verrus system, the user's credentials, such as mobile phone number, vehicle license plate number, credit card number and other information are required to be pre-registered with Verrus. Once registered, the user can park his vehicle in parking lots with which Verrus has established a business arrangement to allow its method of remote payment. The following are prominently displayed in the lot: (a) the fact that this is a Verrus authorized parking lot and (b) a parking lot ID number. The user sends an SMS or makes a phone call to communicate the parking lot ID and her requested parking duration. Parking authority agents (Checkers) can verify the authorization status of parked vehicles by accessing the Verrus server, which is remotely accessible to the Checker.

Other similar systems have also been deployed in many major cities. For example, a cashless parking system has been developed by Parkmobile and deployed in several states in the United States. As in the Verrus system, the user has a prearranged payment agreement with Parkmobile, which is the Parking Service Provider. In order to initiate a parking session, the user has to communicate a Parking Zone ID to a Parkmobile server via his mobile phone. This communication can occur by calling a phone number or entering data on the user's mobile phone as part of executing a downloaded mobile application. The method of enforcement is based on a Checker determining the compliance status of each individual vehicle (with respect to the duration of stay and the paid parking fee) using a handheld Checking Terminal to access the Parking Application Server.

Although remote wireless payment systems and methods in support of parking applications are burgeoning in the prior art, these systems currently offer suboptimal user and Checker experiences. Some examples are provided below.

In the prior art systems, requesting parking authorization requires the user to perform one or more of the following operations: (a) make a phone call and verbally communicate various information, including the Parking Zone ID; (b) manually send an SMS with the above information; (c) find and read the zone ID applicable to given parking spot, launch an application on a smart phone and enter data in response to a query from the application. Performing these operations while parked on a busy and noisy street is inconvenient and potentially risky.

Both user and Checker experiences are significantly improved in the present invention. The Checker's job has actually been made more difficult in some prior art wireless parking payment systems. For example, in the Parkmobile system, vehicle's belonging to Parkmobile customers are parked beside other vehicles with no features distinguishing the Parkmobile vehicles. A vehicle of the latter type may be parked in front of a legacy coin meter with an indication of expired session (e.g. a red flag). For every vehicle so parked, the Checker has to first ascertain if it is a Parkmobile vehicle before he can issue a fine (ticket). This ascertaining may be performed by the Checker manually entering the license plate number of the vehicle on to a handheld Checking Terminal connected wirelessly to a Parkmobile server and the server responding with a message stating whether the vehicle is a Parkmobile customer's vehicle with an expired session. The task may be slightly lightened by the license plate being scanned and uploaded to the server electronically. Nevertheless, it is noteworthy that, even if a single Parkmobile vehicle is present among ten other vehicles which are not Parkmobile vehicles, the Checker has to perform the above process for each one of the eleven vehicles. Before the Parkmobile system was introduced, the Checker could issue tickets purely based on the indicated status of the coin meter.

It is further noteworthy that, as present pay by cell systems do not indicate the parked locations of their vehicles with a spatial resolution better than a city block (a city block is the range typically covered by a Zone ID in the Parkmobile system and Zone ID is the highest resolution of vehicle location information available in that system), the Checker has to do a considerable amount of "hunting" to find the approximate locations of vehicles participating in these systems. As explained above, when these vehicles are intermingled with legacy vehicles (not participating in the pay by cell system), it greatly increases the workload of the Checker.

SUMMARY OF THE INVENTION

In embodiments of the present invention, the location is automatically sensed by a User Platform, which may be a Handset or equivalent functionality built into a vehicle, the platform using a positioning technology, such as the Global Positioning System (GPS). This location estimate may be augmented by other technologies, such as known locations of WiFi access point, locations of cellular base stations and, in the case where the parking application is built into the electronic system of the vehicle, on-board motion sensors, like inertial navigation systems.

User Correction of Indicated Position

It is well known that, in dense urban canyons, satellite navigation, such as GPS, often provides relatively large position errors owing to limited satellite visibility and multipath propagation. This was recognized in U.S. Pat. Nos. 7,215,255 and 8,140,265, where complex filtering methods were proposed to improve the accuracy; nevertheless, it was admitted that, in spite of such filtering, dependence on motion sensors might be necessary to improve the accuracy. In the present invention, user inputs are used to correct the indicated position. The user input may be realized though several embodiments.

In one embodiment of user provided correction, a User Platform indicates an estimated position on an electronic map, which position may be corrected by the user based on an awareness of his whereabouts. As in prior art navigation systems, currently available in Handsets and vehicles, the user may be aided by the map displaying prominent landmarks and street names. The user may correct the User Platform-indicated position by selecting a position on the displayed map different from the indicated position. The inputting of an alternate position may be performed by the user touching a touch sensitive display screen, using technologies well known in the prior art.

Another embodiment of user provided correction to a User Platform indicated position, relevant to the case of closed garage parking, is described as follows. The User Platform may indicate an approximate position. If and when necessary, the user may correct the indicated position and cause the User Platform to communicate this to the Parking Application Server, responsive to which, the Server communicates to the User Platform a list of closed garages or garages plus entrances (gates) proximate to the corrected position location. The user selects a garage, or a garage plus gate if one garage has several gates, from the provided list. Alternatively, if the garage does have several gates but a gate number is not indicated in the choice of garages, the user may enter the gate number on the User Platform after selecting the garage. This selecting triggers cellular data transactions between the Parking Application Server and a computer in the selected garage (Garage Computer), which enables the user to gain access to the garage.

Automatic Sensing by a Handset of a Vehicle's ID

When the User Platform is a Handset, as opposed to similar electronics built into the car, it is clear that it may be used with different vehicles at different times. In prior art systems, such as Parkmobile, the user is required to enter the license plate number of the vehicle that is to be associated with a given Handset, whose ID is known to the Parking Application Server (shortcuts such as defaulting to the last used vehicle or selecting one of a list of stored vehicle IDs are also supported). In an embodiment, the vehicle associated with a Handset is determined automatically by enabling the Handset to sense the vehicle's ID by means of a sensor located in/on the vehicle and causing this sensing action to trigger a software application (App) in the Handset. The App reads the vehicle ID and stores it in the Handset's memory. The stored vehicle ID is used in parking applications executed on the Handset and remains the default vehicle ID until and unless it is overwritten by another act of sensor scanning.

Various methods of vehicle ID sensing are possible, including but not limited to the following: optical scanning of a bar code, including QR code; RFID interrogation of an RFID tag located in/on the vehicle; Bluetooth transaction performed with a Bluetooth device located in/on the vehicle, the Bluetooth device ID being associated with the vehicle ID.

Automatic Ending of an Active Parking Session

It is preferable for the Parking Application Server to know when a parking session has ended. The termination time of the parking session determines the expired/unexpired status of the session, making the user potentially liable for fines if the session has expired. Furthermore, knowledge of the time-overage (the time by which the user has overstayed the parking session) may be used by a parking authority to graduate the fine (e.g. smaller fines for smaller overages). In some markets, by Parking Authority policy, the user is required to buy a predetermined amount of session time at the onset of the session. In such markets, some legacy systems, such as Parkmobile, provide no provision for the user to end an active parking session. In other markets, where the user only pays for the actual duration of the session, the user is allowed to end an active session (he is motivated to do so as he pays less if the session is terminated earlier). In the former case, the Parking Application Server is unaware of the true status of vehicles showing expired session status in its database—they may still be at the parked location, having overstayed their purchased time, or they may have left. This increases the ambiguity, and therefore the checking workload, for the Checker as the list of expected-expired vehicles is longer than the list of truly expired vehicles.

In the present invention, the user is always allowed to end an active session, regardless of parking policy. He may sometime forget to do so when the policy has caused him to buy a committed session time, but can be suitably incentivized to provide the necessary cooperation. Furthermore, when the User Platform embodiment is always physically tied to the vehicle, as in the case of the parking application being run on the vehicle's electronic system, the ending of a session may be determined without user cooperation by monitoring (i) the location indicated by the vehicle's position location subsystem and (ii) the time rate of change of the indicated location. If both (i) and (ii) show changes greater than appropriately chosen threshold values, it may be concluded that the vehicle has left its parked spot. Examples of threshold values may be 100 m and 10 km/hour but other values may be used without departing from the teachings of this invention. It is noteworthy that it can be desirable to use both location and speed to determine if the vehicle has moved as limited satellite visibility and multipath in dense urban canyons can cause the indicated position to wander slowly around an indicated mean position.

Facile and Rapid Checking Experience

As described under Prior Art, the Checker's experience has deteriorated with the recently introduced pay by cell systems. It is a major objective of this invention to improve the checking experience. This is done by the means described below.

Real time access to vehicle attributes and facile presentation thereof: The Checker is provided with a handheld Checking Terminal, which is wirelessly connected, such as via a cellular data link, to the Parking Application Server. The Terminal may be also equipped with the following capabilities: position location ability based on a technology such as GPS, display, software applications. In one embodiment, the Checker determines an area to be surveyed for targeted enforcement (parking session validation and fine ticket issuance). This area is uploaded by the user, using the Checking Terminal, to the Parking Application Server. In response, the Server downloads the list and attributes of all vehicles that are registered with the Server and located in the targeted area. This list may be displayed with symbols, such as green and red dots, on a map on the Checking Terminal, together with the position of the Terminal, the green dots indicating the locations of vehicles with unexpired sessions and the red dots indicating the locations of vehicles with expired or expected-expired sessions. The distinction between the latter two types of sessions are that the expired sessions relate to vehicles where the User Platform is built into the electronic system of the vehicle and the expected-expired sessions relate to vehicles where the User Platform is a Handset. The reason for the distinction is that, in the case of a Handset, it is not known with certainty whether a vehicle whose sessions has expired is still at the parked location, as described above under Automatic ending of an active parking session. Different colored dots or other symbols may be used to distinguish the two.

The method/system of accessing real time vehicle attribute data, and presenting the data to the Checker in a manner facilitating rapid checking of parked vehicles, may be used in conjunction with other systems, including legacy systems, regardless of the means used to track the locations of parked vehicles. The vehicle locations may be known with less accuracy than in the system of the present invention but the teachings thereof may still be applicable to improve the Checker experience.

Rapid wireless determination of vehicle ID: In an embodiment, all vehicles participating in the system of this invention have in/on them a short range RF transponder, referred to as a tag, which is capable of responding with its identity (ID) and other information to a query using the same RF technology. One example of such a query-response RF technology is RFID but the methods taught in this invention may be used with other wireless transponder technologies. The tag described above may be obtained separate from the vehicle but kept in or on it, similar to present highway toll collection tags/transponders. The tag function used to support parking operations may also be built into, and combined with, a high toll collection function, thereby creating a multi-function tag. As an alternative embodiment, the tag function necessary to support parking operations may also be built into the vehicle's electronic system.

In an embodiment of the present system, the Checker performs session validation (targeted enforcement) as follows. In the vicinity of the parked vehicles, within the coverage range of the wireless technology, the user or the Checking Terminal issues a set of queries, in response to which all vehicles within coverage range respond with their IDs and other information. As described above, the Checking Terminal has received from the Parking Application Server, a downloaded file containing the IDs and session status of all vehicles in the targeted area. The file may also contain one or more attributes of the vehicles that may facilitate recognition, such as some combination of: license plate number, physical description of the vehicle and an image of the vehicle. The Checking Terminal software compares the wireless responses from the parked vehicles with the expired and expected-expired vehicle data in the downloaded file and identifies the vehicles that are still parked. In alternative embodiments, less than all of the vehicles in the coverage area are queried.

In some embodiments, the Checker may issue wireless queries from a slowly moving vehicle without leaving the vehicle—this is referred to as drive-by checking.

Accessing Closed Garages with Autonomous Position Sensing and Cellular Data Links A key aspect of gaining access to closed garages is user/vehicle authentication by the garage infrastructure. Prior art methods exist of performing such authentication using credit cards and RFID. An embodiment of the present invention is drawn to a method of performing the authentication using autonomous position sensing and a cellular or other, wide-area wireless data link. Throughout the narrative of this invention disclosure, wherever cellular wireless technology is referred to, it may be substituted by other wide-area wireless technologies without departing from the teachings of this invention.

In one embodiment, the user approaches a closed garage and launches an App for closed garages on a User Platform, which may comprise a Handset or a subsystem of an in-vehicle electronic system. On a display of the User Platform, the user is shown his own position on a map, which may contain major landmarks to help the user identify his surroundings. The user may choose to correct the indicated position by selecting an alternate position as his true position. This information is uploaded to the Parking Application Server using, for example, a cellular data link. Responsive to the above uploading, the Server downloads a candidate list of proximate closed garages and/or garage gates. When the user is in front of the gate of the garage in which he wishes to park, he selects the garage, or garage plus gate where the garage has multiple gates, on a User Platform display, which may involve touching the display screen at a selected point. If the garage has multiple gates but a gate number ID is not indicated in the list of garages downloaded to the User Platform, a gate number or other ID may also be inputted by the user if the gate number cannot be discerned from the indicated location of the User Platform. This initiates two entrance transactions involving (a) the User Platform and the Parking Application Server, and (b) the Parking Application Server and a computer controlling the access to the garage (Garage Computer). After the user's credentials have been verified, the Parking Application Server requests the Garage Computer to open the gate through a inter-computer handshaking transaction, which ends with an acknowledgment of gate opening being sent to the Parking Application Server. Responsive to the receipt of the acknowledgement, the Server sends a confirmation message to the User Platform and initiates an active parking session.

At the time of departure, the user approaches the exit gate and launches a closed garage App on his User Platform. If necessary, a gate number is indicated by the user if the gate number cannot be discerned from the indicated location of the User Platform. This causes two exit transactions, similar to the entrance transaction described above, to ensue. After checking the user's credentials, the Parking Application Server requests the Garage Computer to open the exit gate. The Parking Application Server also terminates the parking session.

Another embodiment of closed garage parking is described for a scenario where access to the garage is controlled manually by human operators. The steps are a follows. The user in a vehicle enters such a closed garage and parks at an available spot. In some scenarios, he may be required to pay at the start of the parking session whereas in others, payment may be collected at the end of the session. In legacy systems, payment is made by cash or credit card. In the method/system of the invention, the user launches a payment App, which reports his position, possibly corrected by the user as described above, and also indicating the payment amount. After authenticating the user and processing the payment request, the Parking Application Server sends a payment confirmation comprising at least a common data set to both the user's Handset and a data terminal, such as a cellular Handset with appropriate software, held by the garage operators. It is not essential, for the method of this invention to be applicable, that the data terminal has wireless connectivity, although from a portability perspective this may be desirable. The method of this invention is also applicable to a fixed data terminal, such as a computer with wired connectivity to the server. The common data set may contain the vehicle's license plate and a unique authentication code. Other common data, such as the vehicles VIN number and/or an image of the vehicle, may also be supplied. This common data set assures the garage operator that payment has been processed.

The unique authentication code may be made relatively secure by making it difficult to predict, such as by changing the code in a relatively unpredictable way on every transaction with a very long repetition period. Prior art methods of wireless data security may be applied to enhance the security of the transactions performed between the Parking Application Server and the operator's terminal and between the Server and the Handset.

An embodiment relates to a system of payment for parking of a vehicle including a wireless communication device including a positioning device configured to determine a location of the wireless communication device, a transceiver configured to communicate with a server, a processor operably connected to the positioning device and the transceiver. The processor is configured to determine the location of the wireless device, initiate a parking session with the server and transmit the location of the wireless communication device and an ID of the vehicle or the user to the server and allow a user to provide corrections to the location determined by positioning device.

Another embodiment relates to a method of payment of parking of a vehicle including determining the location of the vehicle with a wireless communication device, initiating a parking session with the server, transmitting the location of the wireless communication device and an ID of the vehicle or the user to the server and allow a user to provide corrections to the location determined by positioning device.

Another embodiment relates to a system to determine the identity of a vehicle in which a wireless communication device is located, including an identification device in the vehicle that can be sensed by a sensor in the wireless communication device and the wireless communication device. The wireless communications device includes a transceiver configured to communicate with a server and a processor. The processor is configured to sense an identity of the vehicle from the identification device and communicate the identity to the server.

Another embodiment relates to a method of determining the identity of a vehicle in which a wireless communication device is located including sensing an identity of the vehicle from an identification device in the vehicle with the wireless communication device and communicating the identity to a server.

Another embodiment relates to a system of identification of vehicles with an expired parking status including a wireless identification tag in or on a parked vehicle and a portable Checking Terminal capable of wirelessly reading the wireless identification tag. The portable Checking Terminal is configured to receive information associated with a parked vehicle from a server and the portable checking terminal wirelessly interrogates the wireless identification tags in or on the parked vehicle to identify the parked vehicles with expired parking sessions.

Another embodiment relates to a method of identifying vehicles with an expired parking status including receiving information associated with a parked vehicle from a server and wirelessly interrogating a wireless identification tag in or on the parked vehicle with a portable Checking Terminal to identify the parked vehicles with expired parking sessions.

Another embodiment relates to a system of payment for parking in gated garages including a wireless communications device, comprising a Handset or equivalent functionality built into a vehicle, the wireless communication device configured to communicate with a server and including a parking application and furthermore, a terminal configured to be used by a garage employee, wherein the terminal is connected to the server by wired or wireless means. A parking location is automatically sensed by the wireless communications device, using a positioning technology. A user can provide corrections to the parking location with the parking application when desired. The wireless communications device is configured to wirelessly transmit the vehicle's location and a vehicle identification or user identification to the server as inputs for starting a parking session and confirmation of a payment is conveyed to the wireless communications device and to the terminal as a data set.

Another embodiment relates to a method of payment for parking in gated garages including automatically sensing a parking location with a wireless communications device using a positioning technology, providing corrections to the parking location with a parking application on the wireless communications device when desired, wirelessly transmitting the vehicle's location and a vehicle identification or user identification to a server as inputs for starting a parking session with the wireless communications device, and conveying confirmation of a payment as a data set to the wireless communications device and to a terminal configured to be used by a garage employee, wherein the terminal is connected to the server by wired or wireless means.

Another embodiment relates to a system of payment for parking in open streets using one or more functional subsystems built into the electronic system of a vehicle including a wireless data modem configured to communicate with a server, a parking application software loaded into an electronic system of the vehicle, a positioning subsystem configured to use a satellite navigation technology and an inertial navigation technology. The positioning subsystem can automatically sense the vehicle's location and the parking application is configured to send a location and a vehicle identification and or user identification to the server as inputs for starting a parking session.

Another embodiment relates to a method of payment for parking in open streets using one or more functional subsystems built into the electronic system of a vehicle including automatically sensing the vehicle's location with a positioning subsystem configured to use a satellite navigation technology and an inertial navigation technology and sending the location and a vehicle identification and or user identification to a server with a wireless data modem as inputs for starting a parking session.

BRIEF DESCRIPTION OF THE DRAWINGS

FIGS. 1A-1F show exemplary Handset screens for a use case corresponding to initiation of parking, referred to as "Start Parking," in open streets.

FIG. 2 shows a time-domain transaction ladder diagram corresponding to the use case of FIGS. 1A-1F.

FIGS. 3A-3D show exemplary Handset screens for a use case corresponding to the termination of parking, referred to as "End Parking," in open streets.

FIG. 4 shows a time-domain transaction ladder diagram corresponding to the use case of FIGS. 3A-3D.

FIGS. 5A-5C show exemplary Checking Terminal screens according to the methods/systems of session validation, or checking, or targeted enforcement described in the present invention.

FIGS. 7A-7G show exemplary Handset screens for a use case corresponding to initiation of parking, referred to as "Start Parking," in closed garages.

FIG. 7H shows a transaction ladder diagram corresponding to the use case corresponding to initiation of parking, referred to as "Start Parking," in closed garages.

FIGS. 8A-8E show exemplary Handset screens for a use case corresponding to termination of parking, referred to as "End Parking," in closed garages.

FIGS. 10A-10C show Handset screens for vehicle ID sensing by a Handset using optical scanning.

DETAILED DESCRIPTION

Figure 6:
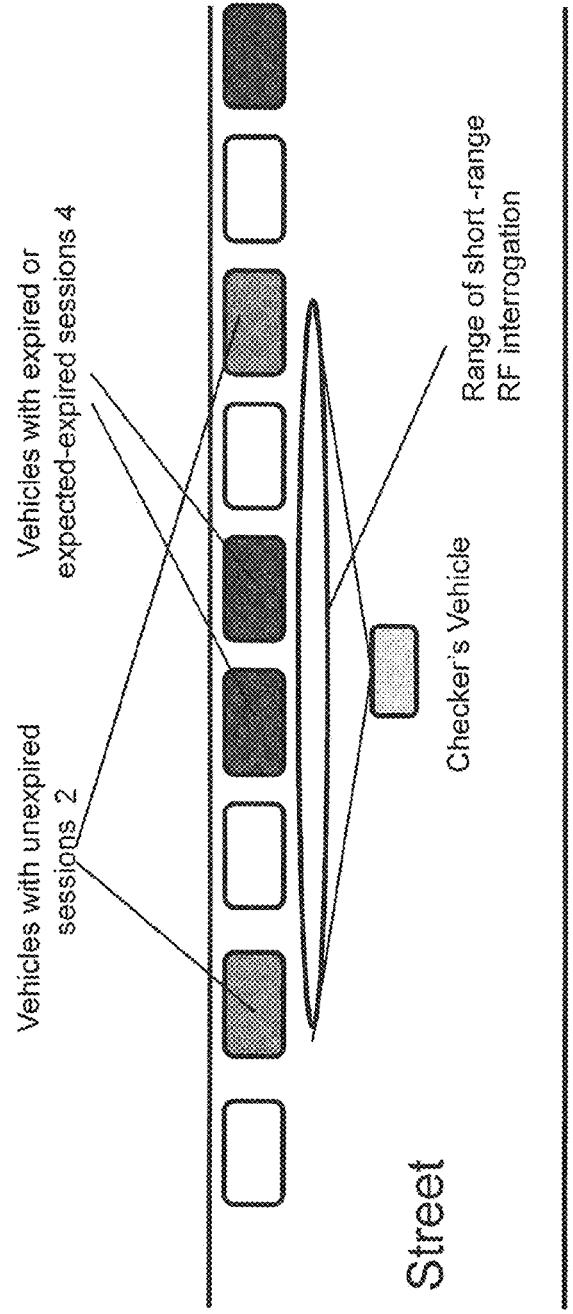
FIG. 6 illustrates how short range wireless validation of parked vehicles may be performed according to the methods/systems described in the present invention.

The present invention will now be described more fully hereinafter with reference to the accompanying drawings, in which typical embodiments of the invention are shown. This invention may, however, be embodied in many different forms and should not be construed as limited to the embodiments set forth herein. Rather, these embodiments are provided as examples of how to implement the principles described in this invention.

GLOSSARY OF TERMS

App—Application software

Checker—An agent of a Parking Authority who is responsible for validating the status (paid/unpaid, expired/unexpired) of a parking session for a given vehicle.

Checking Terminal—A handheld terminal used by the Checker to perform validation of parking sessions, or targeted enforcement, of parked vehicles.

Closed Garage Parking—Parking in areas where the access is controlled by a gate or other barrier.

Garage Company—A commercial entity that owns and operates a parking garage and collects fees for its use.

Handset—Any wireless device, such as a cellular Handset, smartphone or personal data device, carried by a user and used to access the internet.

Parking Application Server—A server, operated by the Parking Service Provider, connected to the internet and running parking applications.

Parking Authority—An entity that owns a parking facility and collects fees for its use. Examples are municipal parking authorities and commercial parking garages.

User Platform—An electronic system including some or all of the following: positioning location subsystems, cellular radio modems, and radio modems for short range RF technologies such as RFID, where the electronic system supports a parking payment application. Examples are Handset and the electronic system of a vehicle.

Parking Service Provider (PSP)—A service provider providing parking payment and other value added services.

Parking Zone ID—An ID (typically a string of letters and numbers) used to identify a collection of parking spaces subject to a common tariff rate.

Payment Service Provider—An entity providing payment services to the Parking Service Provider. Examples are VISA, PayPal, banks.

Payment Server—Computing infrastructure of the Payment Service Provider.

Street Parking—Parking in any open area, where there is no access barrier to the available parking spots. This category includes both actual street parking and parking in open lots with no access control.

<.>—Delimiting symbols used to refer to an icon shown on a display screen, such as <Start Parking>.

FIGS. 1A-1F show a set of screen designs associated with one embodiment of the invention. The screens designs are for a Handset but can be adapted to a vehicular display, where the vehicle's electronic system has similar functions, or subsystems, as a Handset, including some or all of the following: a positioning subsystem consisting of a satellite navigation system such as GPS, a cellular data modem, a short range wireless technology such as Bluetooth and/or near field communications, or NFC. A vehicular electronic system may have additional functions not present in a Handset, such as a motion sensing inertial navigation system that helps to improve the position accuracy beyond that achievable by a satellite navigation system alone. The vehicular electronic system may also have an integrated RFID modem.

In the present application, the term User Platforms is sometimes used to mean either a Handset or a vehicular electronic system, especially when the functions described could be performed by either. However, for specificity, some examples are provided in FIGS. 12A-12D and 13A-13C of how some of the use cases described below for a Handset could be adapted to a vehicular electronic system.

The usage scenario, or use case, illustrated in FIGS. 1A-1F involves a user parking in an open street and launching a parking App to Start a parking session. In modern Handsets, a common way to launch an App is to touch an icon on a touch sensitive display screen. An exemplary list of App icons is shown in FIG. 1A Handset Screen 0, including one for parking, "PSP," (where PSP is an example of a Parking Service Provider company name). In all examples in this invention disclosure, an icon selected by the user according to the narrative is shown shaded.

When the user selects, or touches, the PSP icon in Handset Screen 0 (FIG. 1A), which is shown as a root screen from which all Apps are launched in the examples described herein, the browser opens a subsequent page, where a number of parking options are displayed. As illustrated in FIG. 1B, Handset Screen 1, may be thought of as a root screen for parking Apps as well as the starting screen for a number of administrative options, such as Profile and Settings. It should be noted that the screen sequences described here are only examples of user interfaces for parking applications and that other designs are possible within the scope of the teachings of this invention.

For the present scenario, street parking, the user selects <Street Parking> on Screen 1, which leads (by browser action) to Handset Screen 2 (FIG. 1C). Here, the following may be displayed: (i) the vehicle's license plate (e.g. VA ABCD123), which may be sensed automatically as described below; (ii) the location of the user as indicated by the Handset's position location subsystem; (iii) option for the user to either accept the indicated location by selecting <Accept Location> or correct the indicated position by selecting a different position on the display screen than the one indicated.

The position indicated by a Handset's position location subsystem is expected to be sufficiently accurate for parking operations in most environments. In such environments, with GPS unassisted by inertial navigation but assisted by other technologies such as knowledge of cellular base stations and Wi-Fi access points, an accuracy of 5-10 m is common. However, in dense urban canyons, owing to blockage of satellite signals and multipath propagation, the accuracy may be degraded beyond that acceptable for parking applications, such as introducing an ambiguity/error regarding the street the vehicle is on. An example of such an ambiguous indication is shown in FIG. 1C Handset Screen 2. When the User Platform is integrated into a vehicular electronic system, assistance to the GPS subsystem may be available from an inertial navigation system, which may increase the position accuracy to a level sufficient to enable parking in deep urban canyons without user corrections of the indicated position.

The selection of an alternate position may be performed in a variety of ways, including but not limited to, touching a selected location on a touch sensitive screen or moving a cursor to the selected location and pushing a button. In order to aid the user in gaining awareness of his whereabouts, the displayed map may indicate major landmarks, such as well known buildings and bridges, as well as street names.

The selection of <Accept Location> by the user on FIG. 1D Handset Screen 3 sends a message over a cellular data link to the Parking Application Server indicating that a Handset of specified ID and location, wishes to initiate a street parking session. The Server authenticates the user and sends information back to the Handset about the current parking rates and restrictions at the stated location. This information is displayed as in FIG. 1E Handset Screen 4 and the transactions corresponding to the above steps are illustrated in FIG. 2.

In a variation of the embodiment described above, information about the parking rates and restrictions may be stored in the Handset. This avoids the exchange of a cellular data link message between the Handset and the Parking Application Server corresponding to the request and downloading of the parking rates and restriction information, and thereby reduces the process latency but may increase the storage requirement on the Handset. The choice of a particular embodiment is a matter of design choice.

Handset Screen 4 allows the user to cancel the transaction if, for example, the rates and restrictions are deemed unacceptable. This feature may increase in importance in the future as the present trend is for Parking Authorities to move to dynamic rates that change with parking spot occupancy levels. The user may choose not to park at the present location after reviewing the rates and restrictions.

In the present example, Handset Screen 4 (FIG. 1E) is shown as requiring the user to enter a committed parking session time. Whether the parking session time has to be pre-committed depends on the policy of the Parking Authority—in some municipalities, such as Washington D.C., it is required whereas in others it is not. In some areas, where the policy allows payment for the actual session time, user input of parking time may be redundant and deleted from the steps. The decision to skip the user input step may be based on the location sensed by the position location subsystem and knowledge of local parking policies stored in either the Parking Application Server (and downloaded to the Handset) or the App in the Handset.

The user's commitment to park at the selected spot occurs when he selects <Continue> on Handset Screen 4 (FIG. 1E). This leads to a request/confirm, cellular data transaction with the Parking Application Server, responsive to which FIG. 1F Handset Screen 5 is displayed, which is the last screen of this embodiment of the Start Parking process. The screen shows the session Start time, the scheduled End time (for pre-committed session times), the vehicle ID (license plate number), and the vehicle's location (which may provide an additional user benefit in helping him to locate the vehicle on his return.) This screen may also be regarded as a Session Status screen, which the user may view remotely on his Handset at all times until the session has ended.

FIG. 2 shows a transaction ladder diagram corresponding to the above described steps. The diagram shows the sequence of steps in the time domain, including the points at which cellular data link transactions occur with the Parking Application Server. Both in this example as well as all others in this disclosure, a dotted line is used to indicate a causal connection between two actions; i.e. the action at the start of the arrow leads to the action to which the arrow is pointing. It will be noted that the latency of the entire process is typically determined largely by the two cellular data link transactions for communication with the Parking Application Server; the other steps local to the Handset, that this, they are taken by the browser in response to user inputs and without any external communications. In cases where the parking rate information is not subject to dynamic changes and is advertised to the user through legacy methods, or is otherwise known to the user, or the information is stored in the Handset as suggested above as an alternative embodiment, the action of requesting and downloading the parking rate/restriction information may be deleted to shorten the overall latency of the process.

FIGS. 3A-3D shows the Handset screens for the End Parking use case. As for the Start Parking use case described above, Handset Screen 0 (FIG. 3A) is the root screen from which all Apps in this embodiment are launched. Selecting <PSP>, the parking App icon, leads to Handset Screen 1 (FIG. 3B), where the user selects <Street Parking>. As a session is currently active, this leads, in FIG. 3C Handset Screen 2, to the Session Status screen, where the session is shown as active (the Ending time occurs in the future). It is noteworthy that this behavior is different when <Start Parking> is selected with an inactive Street Parking session, the behavior in that case being shown by Handset Screen 2 in FIG. 1C.

As the use case described above for Start Parking was one of committed parking time, contrasted with indefinite parking time, the session End time is predetermined. However, as there are Checker benefits, described above, to closing the session even if the session has not expired, and assuming that the user can be incentivized to provide the necessary cooperation, the screen provides an <End Parking> option. If the use case corresponds to indefinite parking time, the user selects the <End Parking> button to terminate the session.

Selecting <End Parking> on Handset Screen 2 leads to the terminal screen, FIG. 3D Handset Screen 3. The session details and charged amount are shown on this screen. An option for storing this screen as a digital receipt is provided through <Store Receipt>.

The transaction ladder diagram for End Parking in the Street Parking case is shown in FIG. 4. As in FIG. 2, the diagram shows the sequence of steps in the time domain, including the point at which a cellular data link transaction occurs with the Parking Application Server.

FIGS. 5A-5C shows an example of a screen for a Checking Terminal according to an embodiment of the methods and systems herein. The Parking Application Server has knowledge of the locations of all parked vehicles with active (unexpired), expired and expected-expired sessions. The meanings of these session status terms were explained under Summary of Invention, Facile and Rapid Checking Experience.

In the example of FIGS. 5A-5C, the Checker has decided on a particular area that he is going to survey for checking, or targeted enforcement. In one embodiment, the area may be selected unilaterally by the Checker depending on his work plan, which may be influenced by considerations other than the highest density of vehicles with expired/expected-expired sessions subscribing to a particular Parking Service Provider. In this embodiment, the Checking Terminal sends a message to the Parking Application Server, using a cellular data link, requesting information about the parked locations, session status and attributes of subscribing vehicles in the specified targeted enforcement area. The request may also include the Checker's present location. The Checking Terminal provides enabling means for the Checker to select a target area and to send a message with the information described above. FIG. 5A Screen 1 shows an example of a selected area on such a map. Selecting <Enter> causes the request message to be sent to the Parking Application Server.

In an alternative embodiment, the Checker may request an advisement about the area to survey. This approach may be preferable when most parked vehicles are subscribers to the subject parking payment system, or it is advantageous to check such vehicles separately from other vehicles. In this case, the Checker sends a message to the Parking Application Server, using a cellular data link, requesting advisement on a target area; the request may include the Checker's present location. Responsive to the above request, the Parking Application Server downloads to the Checking Terminal, using a cellular data link, a recommended target area and the parked locations, session status and attributes of subscribing vehicle in the specified area. The area may include the Checker's present location.

Responsive to the receipt of the request message from the Checking Terminal, following either of the above methods for selecting the target area, the Parking Application Server downloads to the Checking Terminal the requested information using a cellular data link. The information may be displayed to the user as shown in FIG. 5B, Screen 2. The location of each vehicle subscribing to the subject parking payment service is shown as an icon, such as a dot, with a distinguishing feature such as color or shape to indicate its session status. In the example shown, the green dots 2 represent vehicles with unexpired sessions and the red dots 4 represent vehicles with either expired or expected-expired sessions. Icons of different colors/shapes may be used to further distinguish the latter two types of sessions. Detailed attributes of vehicles represented by each icon may be blown up and displayed by selecting an icon and requesting more information thereof. In the example of Screen 2 (FIG. 5B), such selecting may be performed by moving a cursor 6 over the icon and selecting <Enter>. Other means of item selection on a displayed screen, well known in the prior art, may also be used.

An example of the detailed attributes is shown in FIG. 5C, Screen 3. Examples of key information are the vehicle license plate number and session information, such as status (unexpired, expired and expected-expired), start time, end time and overage relative to present time. This information may be supplemented by an image of the vehicle, if available and the approximate street location.

The method/system described above of identifying a target area for enforcement, wirelessly downloading information about the identities and parking session status of vehicles parked in the target area, and displaying the information on a Checking Terminal in a way so as to facilitate checking, or enforcement, may be applied to other wireless parking payment systems, using other methods of identifying a vehicle's parked locations, such as zone IDs. In such cases, the indicated vehicle locations may be less precise than in the system described here, such as covering an entire city block. Nevertheless, the systems/methods taught here could still benefit such systems and lead to a reduction of enforcement effort.

FIG. 6 shows an example of performing parking session validation according to the principles taught in this invention. All vehicles participating in the present system are preferably equipped with a short range wireless transponder, or tag, with a range such as 10 m, similar to RFID devices used for highway toll collection. The Checking Terminal is equipped with an RF interrogator that can communicate with the tags. According to methods of RF transponder interrogation known in the art, the interrogator issues a series of interrogations, or queries, as it drives slowly past the targeted parked vehicles. The time-rate at which the queries are issued may be controlled by the Checker and will depend on the speed of the drive-by vehicle. The tags in the vehicle respond to the queries according to the rules of a chosen protocol, such as one which has the ability to resolve potentially colliding responses from a multiplicity of tags, such as specified in IS018000-C.

The responses from the tags contain the vehicle IDs. These responded IDs are compared by the software in the Checking Terminal for matches with the downloaded IDs of subscriber vehicles located at that targeted area. It is expected that not all expected-expired vehicles may be physically present, for the reasons described above. Therefore, the vehicles (physically present at the targeted location) which may be ticketed are either those with expired status or are a subset of vehicles with expected-expired status. Based on these matches, and assisted by the attributes of the vehicles such as license plate number and image displayed on the Checking Terminal, the Checker identifies the physical vehicles for enforcement.

FIGS. 7A-7G show exemplary Handset screens for a method/system of payment for closed garages, for the Start Parking use case, using cellular data links. Prior art teaches how short range RF technologies, such RFID, may be used for user authentication for closed garage access. In an embodiment of the present invention, an alternate method using cellular data links and autonomous position sensing may be used. As in the other exemplary use cases, FIG. 7A Handset Screen 0 is a root screen and the next screen, FIG. 7B Handset Screen 1, involves selecting the particular parking payment App, <Garage Parking>. Responsive to this selection, the Handset's present location, as determined by the Handset's position location subsystem, is displayed on a map, as in FIG. 7C Handset Screen 2. The User may accept the indicated position or correct it by touching another location on the displayed map. The user's input is accepted by the parking App and a new location is displayed, as shown on FIG. 7D Handset Screen 3. If the user is satisfied with this location, he selects <Accept Position>.

Responsive to the user selecting <Accept Position>, a message is sent to the Parking Application Server containing the Handset location, as shown on FIG. 7D Handset Screen 3, requesting the Parking Application Server to send information shown in FIG. 7E Handset Screen 4. In this screen, a candidate list of nearby garages are shown, these garages having registered with the Parking Service Provider for the subject payment service. The locations of the garages may be shown on the map of FIG. 7E Handset Screen 4, although not actually shown in FIGS. 7A-7G for simplicity. In some embodiments where the garage has multiple gates, the garage choices shown in FIG. 7E Handset Screen 4 may be associated with gate choices, such as Garage N/Gate X instead of just Gate N. In yet other embodiments, the system may require the user to enter a sign posted gate ID, which is the embodiment described here as an example. The user selects one of the indicated garages and approaches one of its entrance gates.

Responsive to the user selecting one of the garages, such as <Garage N> in FIG. 7E Handset Screen 4, the browser displays FIG. 7F Handset Screen 5, on which the user is required to enter a gate ID, in cases where the selected garage has multiple gates and/or the gate ID cannot be discerned from the user's location and the gate ID was not an attribute of the garage ID. If there is only a single gate, this step is skipped. Knowledge exists in the system (either in the Parking Application Server or in the App in the Handset) of the gate multiplicity of each garage participating in the payment system. The gate ID is prominently displayed at the gate. The user enters the gate ID on FIG. 7F Handset Screen 5 and selects <Continue>. This causes a request message to be sent to the Parking Application Server to Start a parking session. The request message contains the gate ID as a field.

Responsive to the receipt of the request message, the Parking Application Server, after validating the request, sends an Open Gate request to the Garage Computer to open an indicated gate. Responsive to the receipt of the request, and following normal authentication between the servers, the Garage Computer opens the requested gate and sends an Acknowledgement to the Parking Application Server. Responsive to the receipt of the Acknowledgement, the Parking Application Server sends a confirmation message to the Handset containing the data shown on FIG. 7G Handset Screen 6. This is also the Session Status screen, which the user can view remotely at all times (by logging on to the Parking Application Server) at least as long as the session is active.

FIG. 7H shows a time domain, transaction ladder diagram corresponding to the sequence of steps described above and illustrated in FIGS. 7A-7G. In particular, the diagram shows the points in the sequence of steps when the over-the-air transactions with the Parking Application Server are required.

FIGS. 8A-8E shows exemplary Handset Screens for the closed garage End Parking use case, corresponding to the closed garage Start Parking use case described above. It will be noted that the transactions for entrance-access and exit-access are similar, with the latter being a reduced subset of the former. The user approaches an exit gate and, on the root screen, FIG. 8A Handset Screen 0, selects the parking App, <PSP>, and on FIG. 8B Handset Screen 1, <Garage Parking>. The Handset App is aware that a session is currently active and, based on this knowledge, opens FIG. 8C Handset Screen 2, which displays the current session status. This screen includes an option to close the session, which the user selects by selecting <End Parking>. This causes the browser to open FIG. 8D Handset Screen 3, where the user is required to enter a gate ID, in cases where the garage has multiple gates and/or the gate ID cannot be discerned from the user's location. If the garage has a single gate, this step may be skipped. On Handset Screen 3 (FIG. 8D), the user enters the gate ID, which is prominently posted near the selected gate, and selects <Continue>, responsive to which a message is sent to the Parking Application Server to close the session and to open the indicated exit gate. Responsive to the receipt of this request, the Parking Application Server sends an "Open Gate" request message to the Garage Computer, indicating the gate ID. After validating the request, the Garage Computer opens the requested gate and sends an Acknowledgement to the Parking Applications Server. Responsive to the receipt of the Acknowledgement, the Parking Application Server sends a confirmation message to the Handset containing the contents of FIG. 8E Handset Screen 4. This screen shows the amount charged and has a button which allows the storage of the screen as a receipt in the Handset.

Figure 8D:
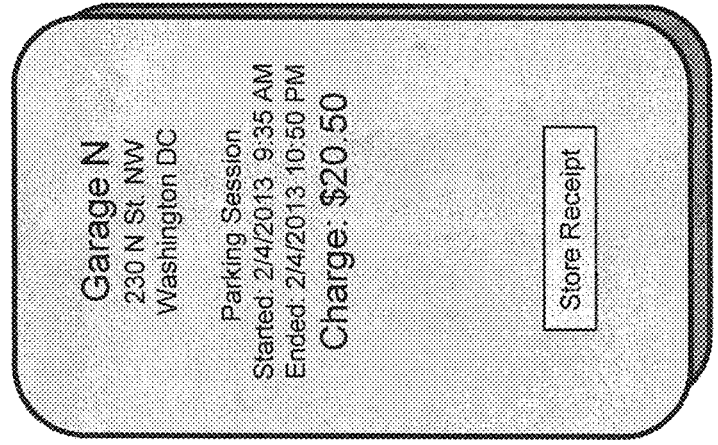
Figure 8E:
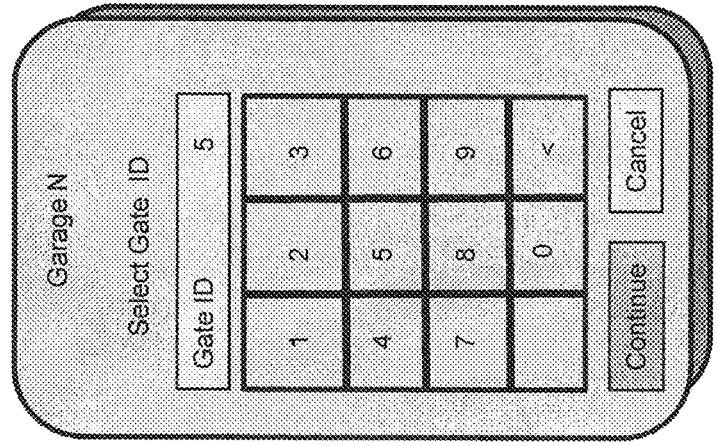
Figure 8F:
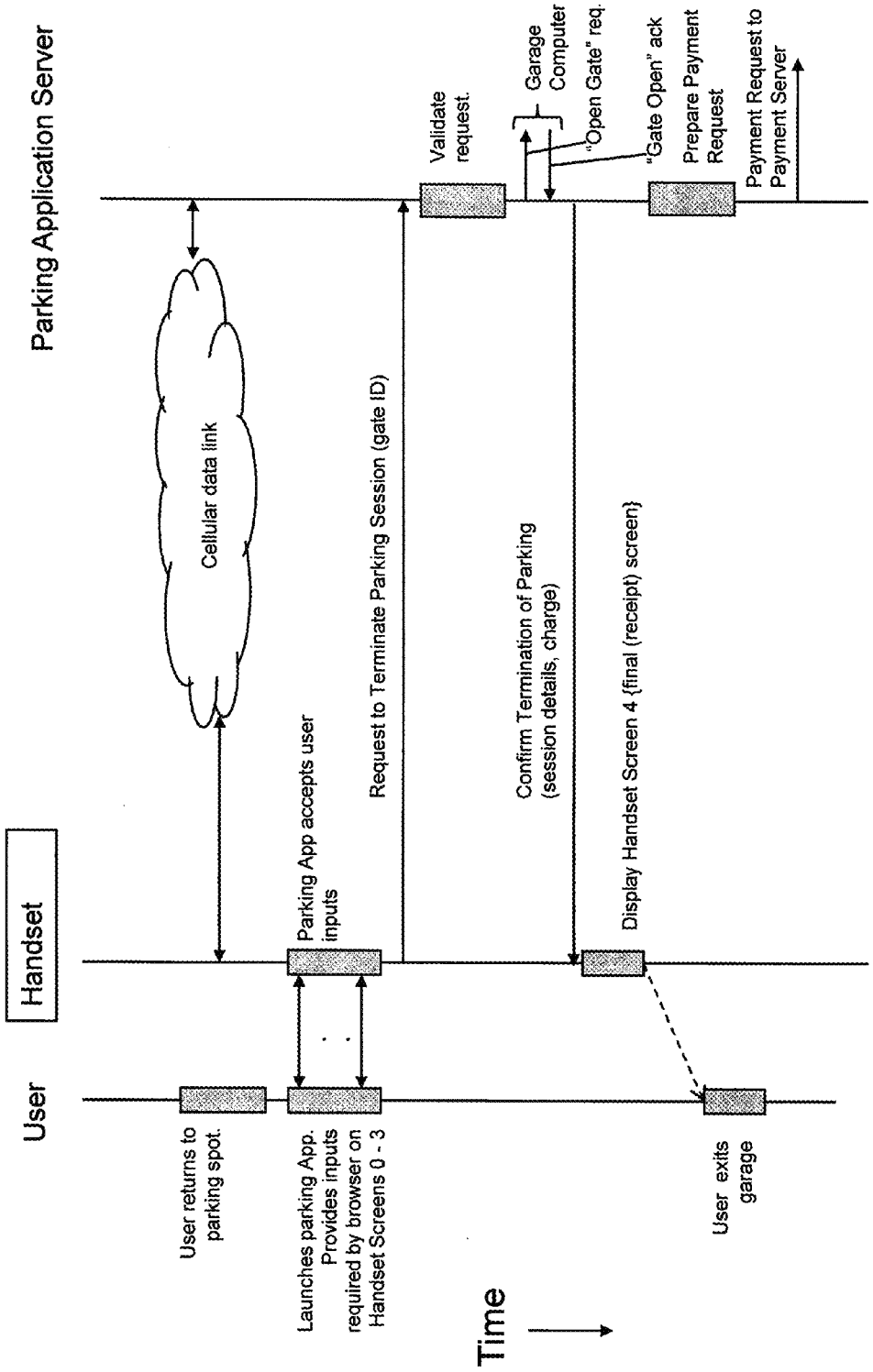
FIG. 8F shows a transaction ladder diagram corresponding to the use case corresponding to termination of parking, referred to as "End Parking," in closed garages.

FIG. 8F shows the above steps as a time domain, transaction ladder diagram.

Figure 9A:
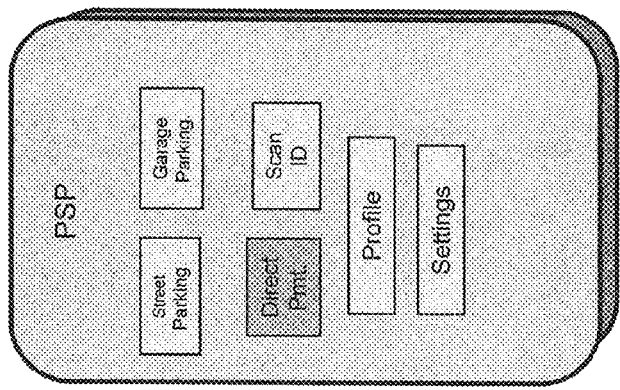
FIGS. 9A-9G show exemplary Handset screens for a use case corresponding to direct payment for parking made to human operators of a closed garage.
Figure 9B:
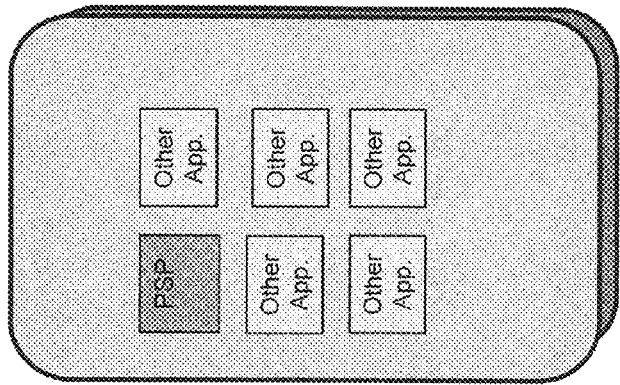
Figures 9C, 9D:
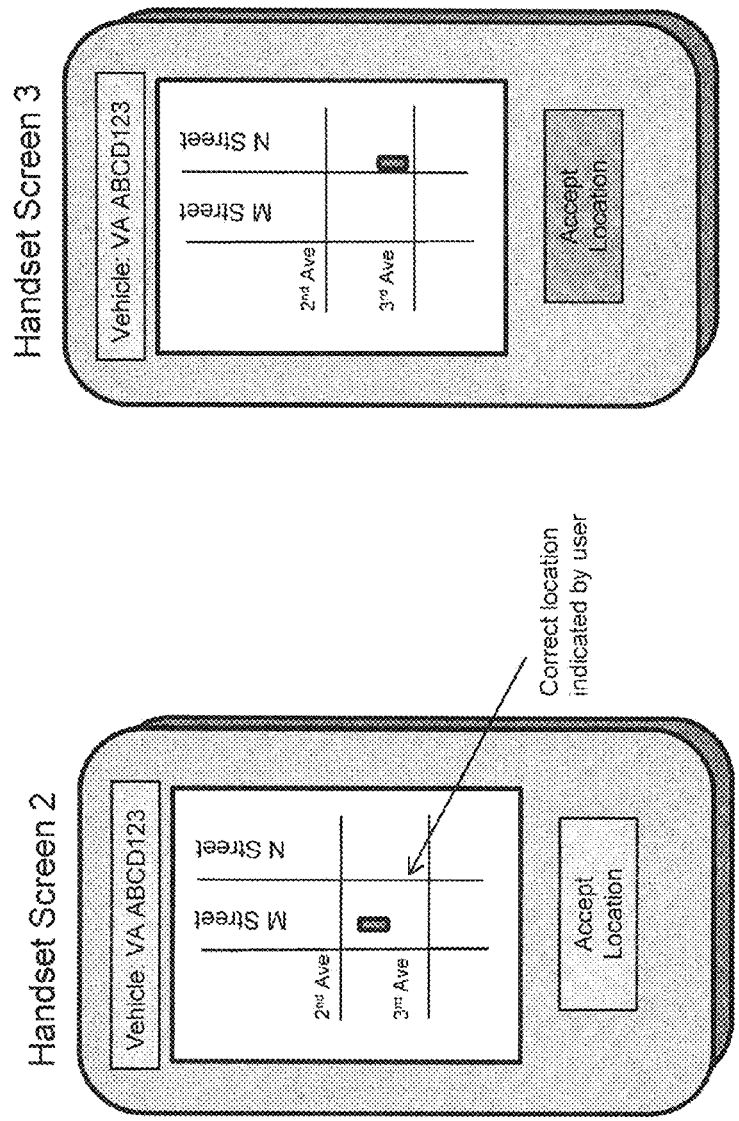
Figure 9G:
Figure 9F:
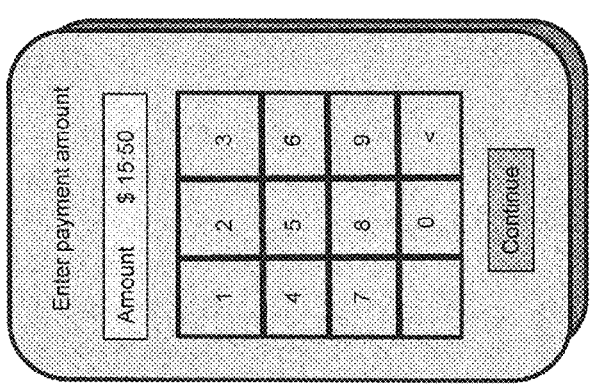
Figure 9E:
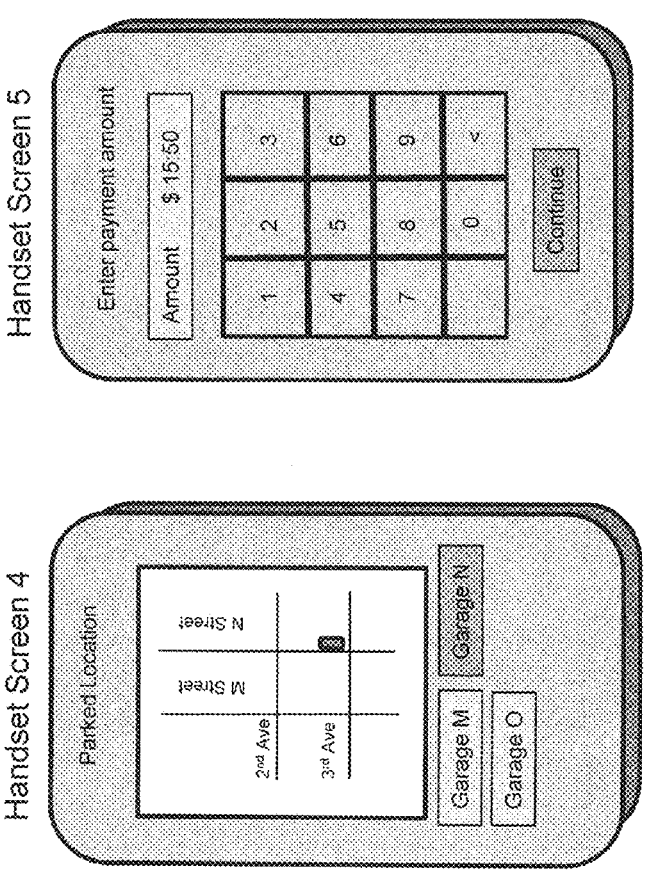

FIGS. 9A-9G show exemplary Handset Screens for an embodiment where the user makes a direct payment to a human operator of a closed garage. The Handset Screens may be adapted to vehicle display screens when the Handset functionality is built into a vehicle. Such embodiments are equally covered by this invention, although the present example describes an embodiment where the User Platform is a Handset. Many closed garages either lack the infrastructure for computer controlled access or have an overriding need for manual control of entrance and exit access, such as in valet parked garages. In all such cases, the user's payment experience can be made more facile and secure by the use of wireless payment, as described herein. FIG. 9A Handset Screen 0 is the root screen, as described above. In FIG. 9B Handset Screen 1, the user selects <Direct Payment>. This leads to FIG. 9C Handset Screen 2, where an approximate user location is indicated by the Handset's position location subsystem. The user may accept this location or correct it as shown in FIG. 9D Handset Screen 3. As in the case of mechanized closed garage access (Start Parking), described above, this leads to a cellular data transaction with the Parking Application Server, which sends a set of candidate garages. The set may have only one member if there is little uncertainty about which garage the user is in. The user selecting the correct garage, such as by selecting <Garage N> in FIG. 9E Handset Screen 4, leads to FIG. 9F Handset Screen 5, where he enters the payment amount and selects <Continue>. This causes a message to be sent to the Parking Application Server, using a cellular data link, indicating the garage ID and the payment amount. The Server validates the request and sends a confirmation message to both the user's Handset and a wireless data terminal held by the garage operator, which may be a commercial smartphone with appropriate application software. Exemplary confirmation screen information are shown in FIG. 9G Handset Screen 6. In an embodiment, the information includes an authentication code, "AUTH CODE", which is difficult to predict, such as a code that is changed in a relatively unpredictable way for every transaction, with a sufficiently long repetition period to minimize the risk of fraud. As a payment amount is involved in the message and the authenticity of the Server may be doubted by the garage operator (a Server operated by a malicious user could be configured to send a fake Handset Screen 6 (FIG. 9G) to both the user and the garage operator), it may be desirable to further minimize security risk by securing the wireless data links using a prior art mutual authentication and encryption technology.

Figure 11:
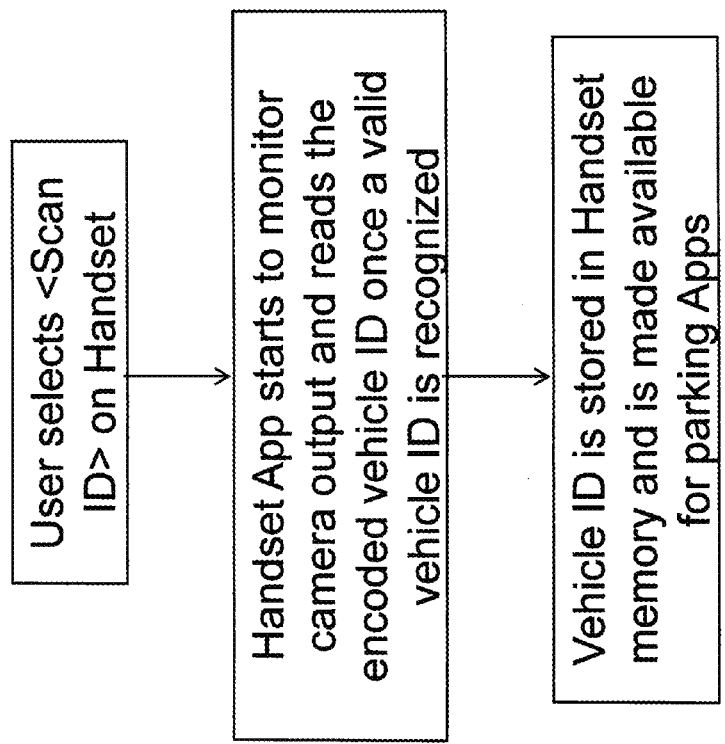
FIG. 11 is a flow diagram showing the operational steps involved in vehicle ID sensing by a Handset using optical scanning.

FIGS. 10A-10C illustrate Handset screens for a method/system for a Handset to automatically sense a vehicle ID by optical scanning. After selecting the parking App, <PSP>, on FIG. 10B Handset Screen 1, the user selects the optical scanning application by selecting <Scan Vehicle ID> on Handset Screen 1 (FIG. 10B). This activates the Handset's camera and a Handset application which analyzes the data from the camera for a match with a valid vehicle ID pattern. If a match is found, the vehicle's license plate number is displayed, as on FIG. 10C Handset Screen 2, and stored in the Handset memory for use by parking applications. The user selects <Continue> to return to the root screen. FIG. 11 shows a flow diagram of the steps involved in the process.

Automatic sensing of the vehicle ID may also be performed by other sensor technologies, such as near field communications (NFC) and Bluetooth.

NFC may be used by locating a passive NFC tag in the car and bringing a Handset supporting NFC within coverage range (few centimeters) of the tag. The sensing of the tag automatically starts an App which can be programmed to accept the responded vehicle ID and overwrite the previous one (if one exists) in the data memory accessed by the parking applications described here.

Bluetooth may be used by either using the Bluetooth function provided as a part of the vehicle's built in electronic system or a low power Bluetooth tag placed in the vehicle. Bluetooth paring of a vehicle's electronic system and a Handset are commonplace in modern vehicles. The vehicle's ID for parking applications may be linked to the Bluetooth ID used in such pairing. Low power Bluetooth tags have been used to track personal items and pets. Such tags may also be used in lieu of the vehicle's native Bluetooth system. An advantage of using Bluetooth over other sensor methods is that the vehicle ID sensing is automatic when the user enters the vehicle, i.e. transparent to the user, requiring no action on his part.

FIGS. 12A-12D shows how a street parking (Start Parking) App may be supported on a vehicular electronic system, based on adaptations of Handset screens. On the root screen, FIG. 12A Vehicle Display Screen 0, the user launches the parking App by selecting <Parking>. This sends a message to the Parking Application Server via a cellular data link. The message contains the vehicle's ID and its position, indicated by its position location subsystem. As in the Handset case, it is possible to add another screen to allow the user to correct the indicated position, and such embodiments are covered by the methods/systems taught in this invention, although not shown in FIGS. 12A-12D. However, such correction is less likely to be necessary when the User Platform is integrated into the vehicle's electronic system, as positioning assistance may be available from the vehicle's inertial navigation system which may obviate the necessity for correction.

Figure 12A:
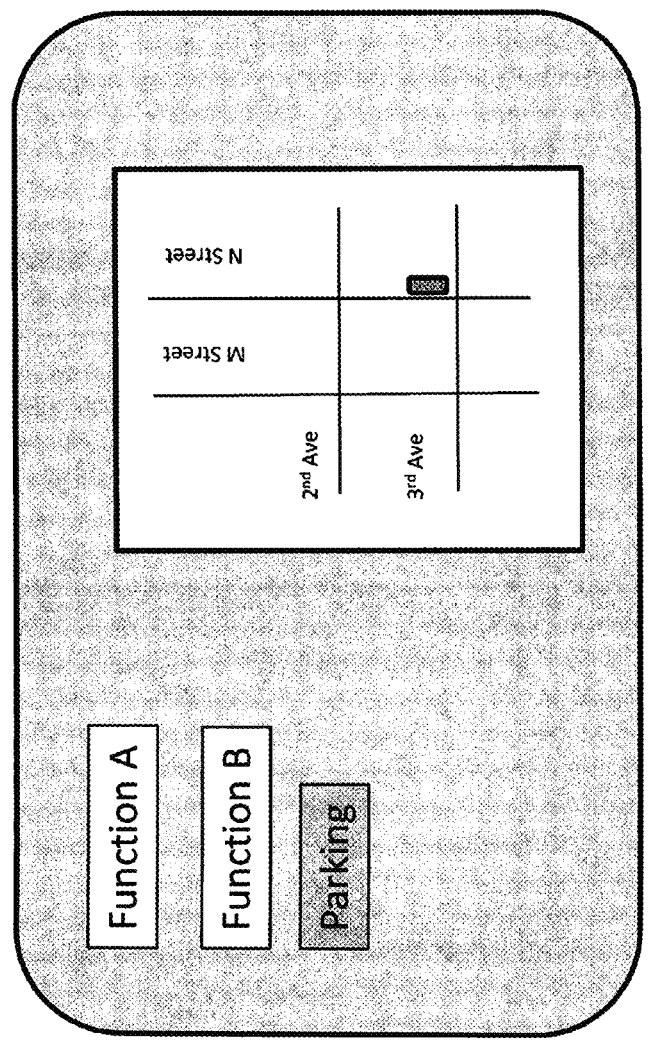
FIGS. 12A-12D show examples of a vehicular display screen for Start Parking in open streets when the User Platform is integrated into the vehicle's electronic system.
Figure 12B:
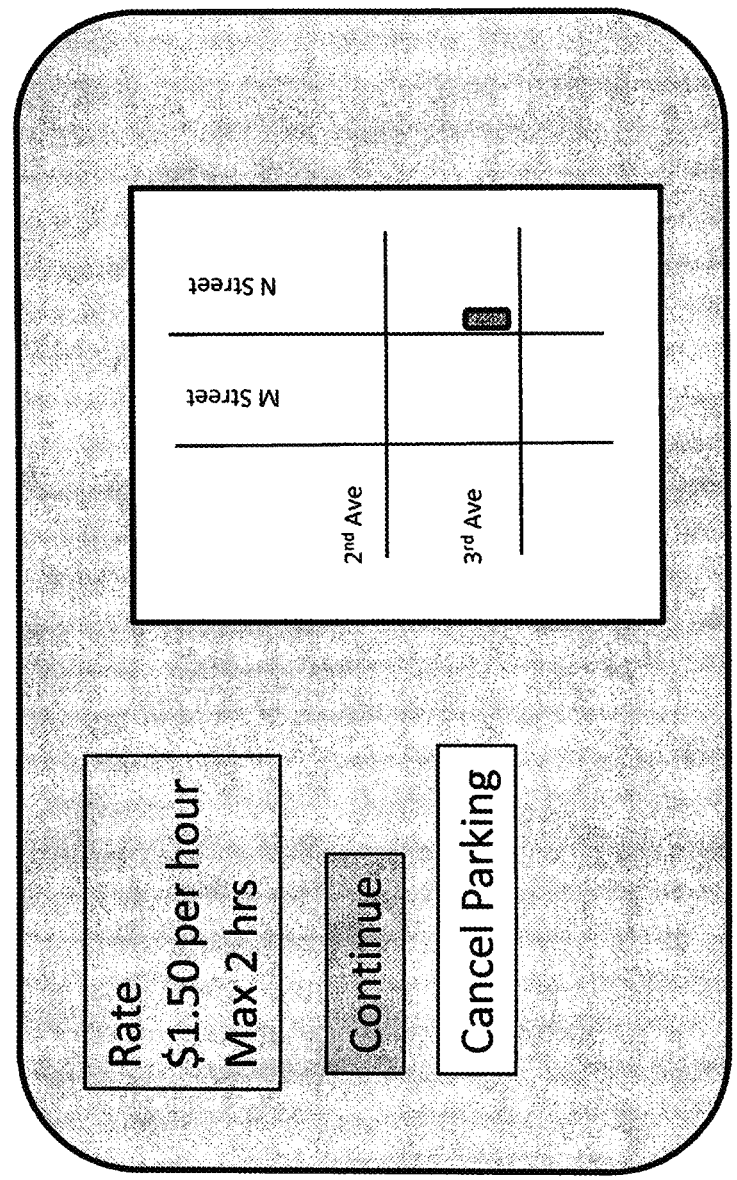

The Parking Application Server responds with the parking rate and restrictions information, which are displayed in FIG. 12B Vehicle Display Screen 1. If the rate/restrictions are acceptable, the user selects <Continue>; if not, he selects <Cancel Parking>. Assuming that he selects the former, the next screen, FIG. 12C Vehicle Display Screen 2, requests the user to enter a committed parking session time, assuming that such commitment is required by the parking policy. The browser may be programmed to skip this step based on the vehicle's location and knowledge of the policy of the local Parking Authority.

Figure 12C:
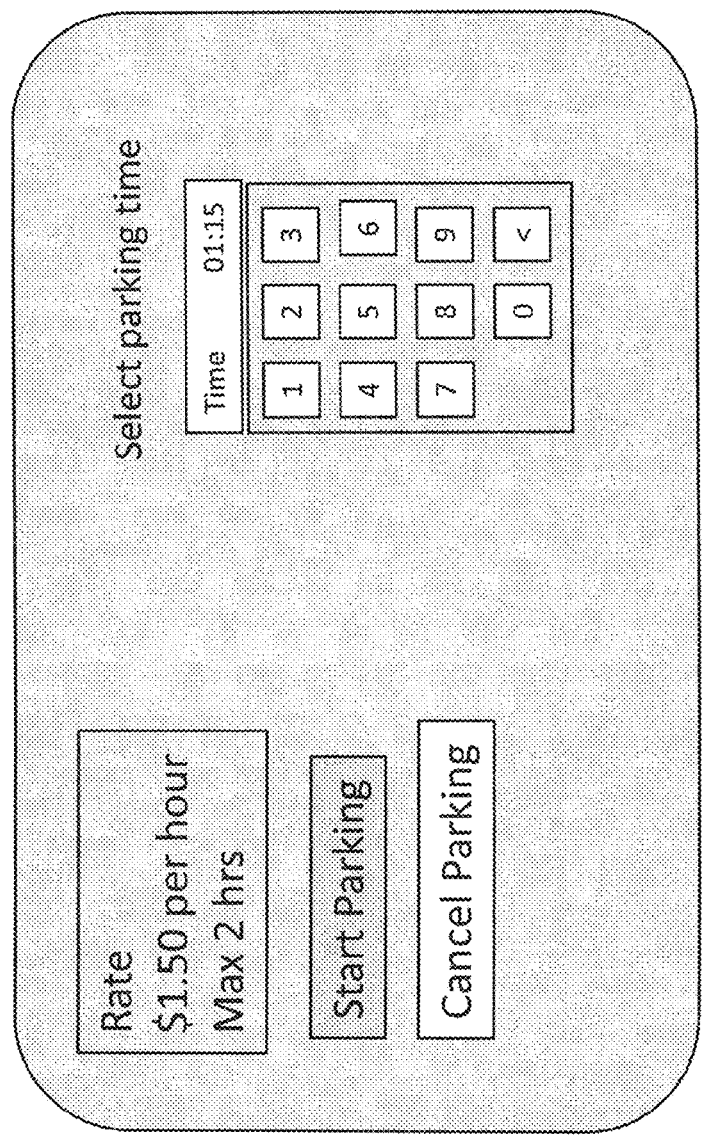
Figure 12D:
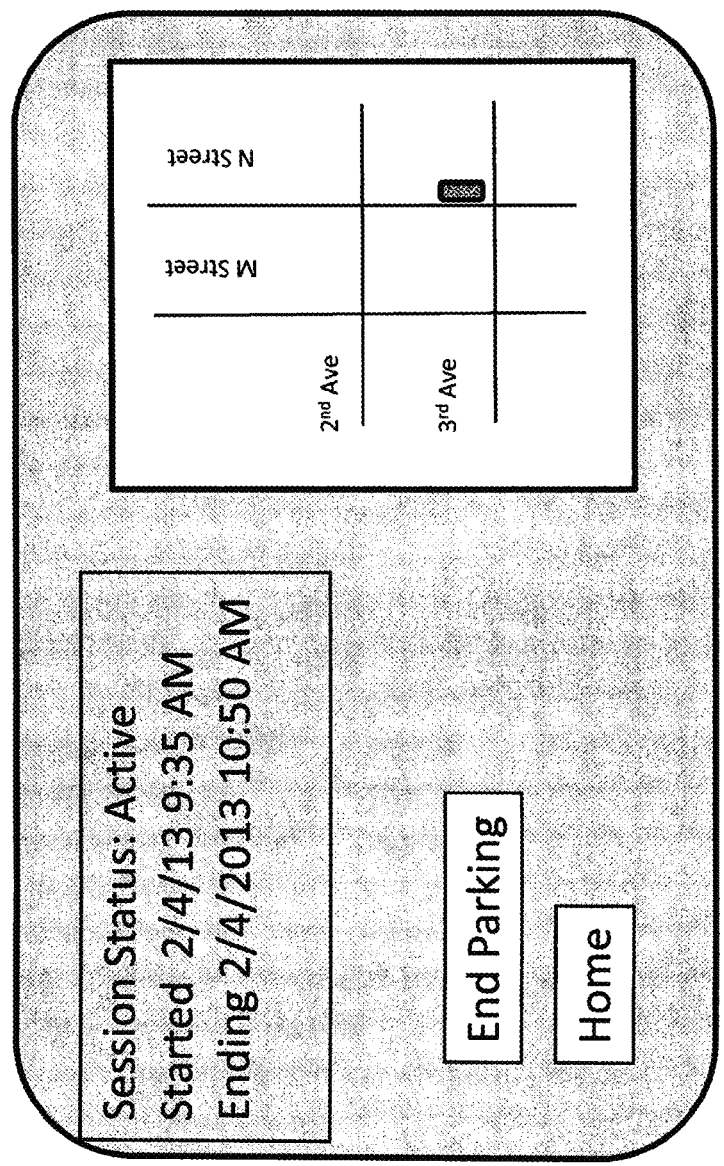

Following the entering of committed parking session time in FIG. 12C Vehicle Display Screen 2, the user selects <Start Parking>. This sends a message to the Parking Application Server, which causes a parking session to be started at the Server and a confirmatory Session Status screen is returned to the User Platform, which is displayed as FIG. 12 D Vehicle Display Screen 3. The user may exit the parking App and return to the root screen, Screen 0 (FIG. 12A), by selecting <Home> on this screen.

If Screen 2 (FIG. 12C) were deleted based on knowledge of the local Parking Authority's policy and no user correction of the indicated position were required, the number of user steps required to complete the Start Parking process would be reduced to two, comprising those in Screens 0 and 1 (FIGS. 12A, 12B). If the rate/restriction information were known through other means, the number of screens requiring user input could be reduced to one (Screen 0, FIG. 12A), leading to one-touch parking.

Figure 13A:
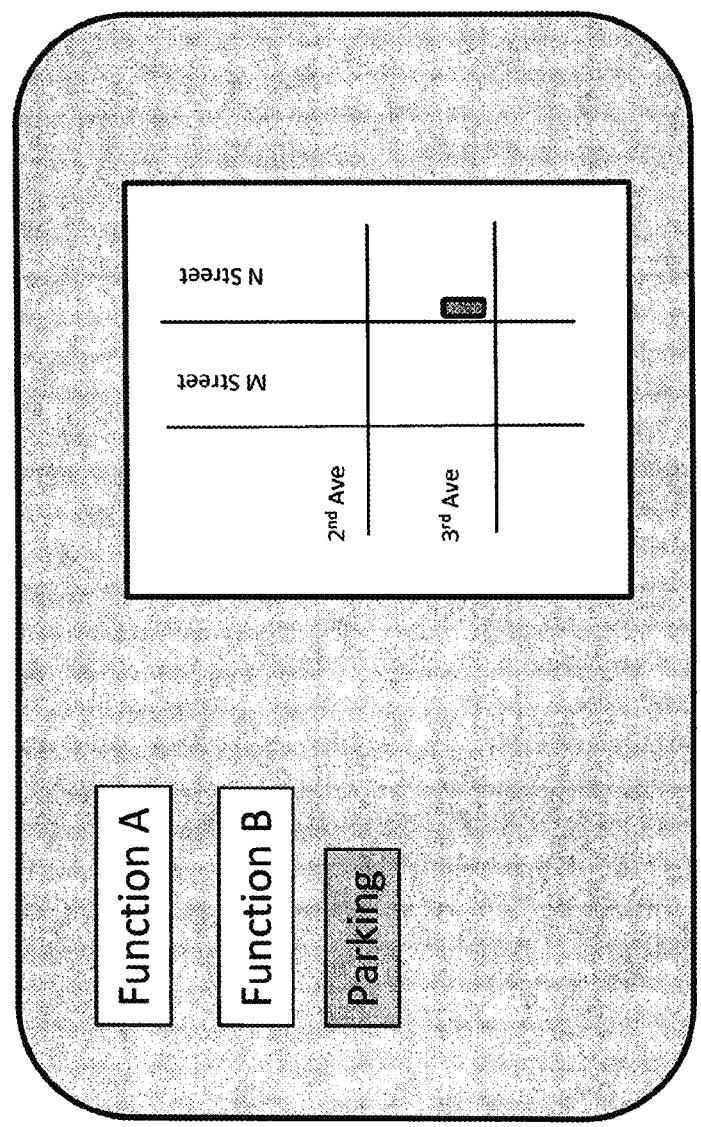
FIGS. 13A-13C show examples of a vehicular display screen for End Parking in open streets when the User Platform is integrated into the vehicle's electronic system.
Figure 13B:
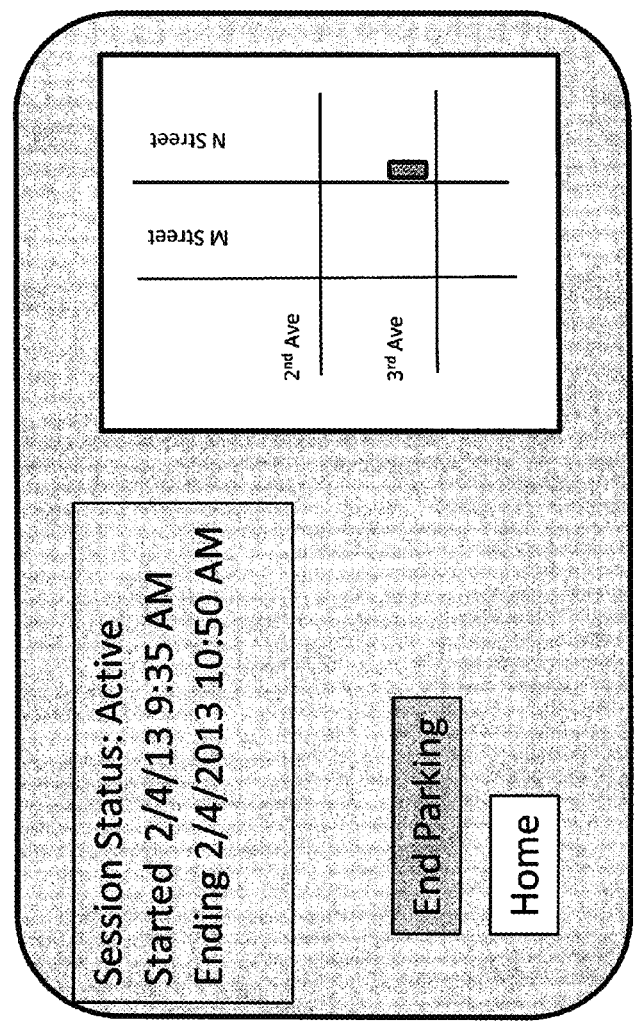
Figure 13C:
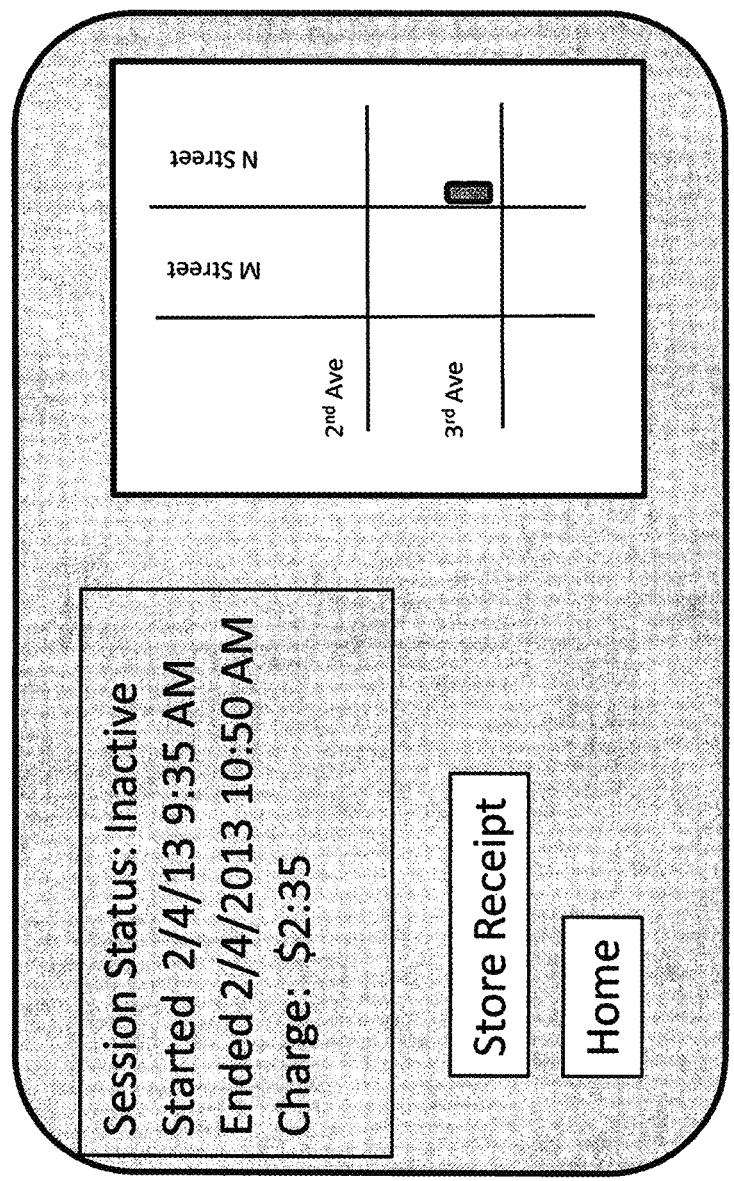

FIGS. 13A-13C show the street parking (End Parking) use case executed from the vehicular electronic system. The user selects <Parking> in the root screen, FIG. 13A Vehicle Display Screen 0. As the session is known to be active, the browser opens the Session Status screen, FIG. 13B Vehicle Display Screen 1. Here the user selects <End Parking>. This sends a message to the Parking Application Server, which causes the session to be terminated at the Server and a confirmatory receipt screen, containing the session start and end times and the amount charged, to be returned to the User Platform. The user may store the receipt and/or return to the root screen by selecting <Store Receipt> and <Home> buttons, respectively, shown on the exemplary FIG. 13C Vehicle Display Screen 2.

What is claimed is:

1. A method of payment for parking of a vehicle in an open street with a portable wireless communications device or a wireless communications device built into the vehicle's electronic system over a communications network comprising:
    determining the identity of the vehicle by automatically sensing an identification device by the portable wireless communications device with a sensor located in the portable wireless communications device, wherein the identification device is located in the vehicle and wherein the identification device and portable wireless device are distinct devices and wherein determining the identity comprises using near field or short range wireless communications;
    determining the location of the vehicle using a satellite navigation system, the location determined by a processor;
    initiating a parking session via a transceiver with a parking application server, the parking session initiated by the processor;
    transmitting with the transceiver the location of the vehicle and the identity of the vehicle to the parking application server;
    allowing a user to input an alternative location different from the location determined by positioning system, wherein the user inputting an alternative location includes the user touching a user selected location on a touch sensitive screen or moving a cursor to a user selected location and pushing a button, wherein the user input only provides an alternative location for the parking session, and wherein the user input sets the alternative location as user's parking spot for the parking session and initiates the parking session.

2. The method of claim 1, wherein the identification device comprises any of:
    a near field communications device, a short range wireless technology device, a camera-scannable quick response code, bar code, written name, written identification code, or a short range RF tag.

3. The method of claim 1, further comprising providing enforcement agents with geographic knowledge of the location(s) of parked vehicles with expired parking sessions, wherein the geographic knowledge only comprises geographic coordinates.

4. The method of claim 3, further comprising:
    receiving information from the parking application server and displaying the information on a portable checking terminal,
    wherein the information is associated with one or more parked vehicles and wherein the information comprises one or more of:
        parking session start and end or expected end times,
        parking session status selected from the group consisting of expired and known to be still parked, unexpired, and expected-expired; or
        vehicle attributes selected from electronic identity, make/model/color and vehicle image.

5. The method of claim 4 wherein the parked vehicles have in or on them at least one wireless identification tag and the portable checking terminal is configured to wirelessly interrogate the at least one identification tag by direct communication between the portable checking terminal and the at least one wireless identification tag to identify parked vehicles with expired parking sessions.

6. The method of claim 5, further comprising:
    using the portable checking terminal to compare actual identification responses from the parked vehicles with the information received from the parking application server regarding vehicles with expected-expired parking status; and
    determining which of the vehicles with expected-expired parking status are still physically parked in the approximate location.

7. The method of claim 1, wherein the sensing of the identification device by the portable wireless communications device comprises wireless communications between the identification device and the wireless communications device.

8. A system comprising:
    a wireless communications device comprising a processor providing user input and output and position location capability; and
    a parking application server connected to the wireless communications device,
    wherein the wireless communications device and the parking application server are configured to perform a method of payment for parking of a vehicle comprising:
    determining the identity of the vehicle by the wireless communications device by automatically sensing with a sensor located in the wireless communications device an identification device wherein the identification device is located in the vehicle and wherein determining the identity comprises using near field or short range wireless communications;
    determining the location of the vehicle using a satellite navigation system, the location determined by the processor;
    initiating a parking session via a transceiver with a parking application server, the parking session initiated by the processor;
    transmitting with the transceiver the location of the vehicle and the identity of the vehicle to the parking application server, the location of the vehicle transmitted by the wireless communications device; and
    wherein the system is configured to allow a user to input an alternative location different from the location determined by the vehicle positioning system, wherein the inputting an alternative location includes the user touching a user selected location on a touch sensitive screen or moving a cursor to a user selected location and pushing a button, wherein the user input only provides an alternative location for the parking session, and wherein the user input sets the alternative location as user's parking spot for the parking session and initiates the parking session.

9. A system comprising:
    a wireless communications device comprising a processor built into a vehicle's electronic system, the wireless communications device configured to provide connectivity to a parking application server;
    a user input and output system built into the vehicle's electronic system;

a vehicle positioning system which provides position location capability based on inputs from the following built-in subsystems: satellite radio navigation and inertial navigation; and a parking application server connected to the wireless communications device, wherein the wireless communications device and the parking application server are configured to perform a method of payment for parking of a vehicle comprising:

determining the location of the vehicle using the vehicle positioning system, the location determined by the processor;

initiating a parking session via a transceiver with a parking application server, the parking session initiated by the processor;

transmitting with the transceiver the location of the vehicle and the identity of the vehicle to the parking application server, the location of the vehicle transmitted by the wireless communications device; and wherein the system is configured to allow a user to input an alternative location different from the location determined by the vehicle positioning system, wherein the inputting an alternative location includes the user touching a user selected location on a touch sensitive screen or moving a cursor to a user selected location and pushing a button, wherein the user input only provides an alternative location for the parking session, and wherein the user input sets the alternative location as user's parking spot for the parking session and initiates the parking session.

10. The system of claim 9, wherein the system is configured to:

automatically determine an end of a parking session based on inputs provided by the vehicle's positioning system using at least one of the vehicle's location and speed; and communicate the end of the parking session to the parking application server and/or a user.

* * * * *